United States Patent
Barry et al.

(10) Patent No.: US 9,752,024 B2
(45) Date of Patent: Sep. 5, 2017

(54) COMPATIBILIZED POLYOLEFIN BLENDS

(71) Applicant: Dow Global Technologies LLC, Midland, MI (US)

(72) Inventors: Russell P. Barry, Horgen (CH); Yushan Hu, Pearland, TX (US); Kim L. Walton, Freeport, TX (US); Gary R. Marchand, Gonzales, LA (US); Colin LiPiShan, Pearland, TX (US); Raymond L. Laakso, Jr., St. Francisville, LA (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/029,484

(22) PCT Filed: Oct. 7, 2014

(86) PCT No.: PCT/US2014/059450
§ 371 (c)(1),
(2) Date: Apr. 14, 2016

(87) PCT Pub. No.: WO2015/057423
PCT Pub. Date: Apr. 23, 2015

(65) Prior Publication Data
US 2016/0264765 A1 Sep. 15, 2016

Related U.S. Application Data

(60) Provisional application No. 61/891,245, filed on Oct. 15, 2013.

(51) Int. Cl.
*C08L 53/00* (2006.01)
*C08L 23/12* (2006.01)
*C08L 23/06* (2006.01)
*B29C 41/00* (2006.01)
*B29C 41/04* (2006.01)
*B29K 23/00* (2006.01)

(52) U.S. Cl.
CPC ............ *C08L 23/12* (2013.01); *B29C 41/003* (2013.01); *B29C 41/04* (2013.01); *C08L 23/06* (2013.01); *B29K 2023/12* (2013.01); *C08L 2205/03* (2013.01); *C08L 2205/035* (2013.01); *C08L 2205/08* (2013.01)

(58) Field of Classification Search
None
See application file for complete search history.

(56) References Cited

U.S. PATENT DOCUMENTS

| | | |
|---|---|---|
| 5,082,902 A | 1/1992 | Gurevitch et al. |
| 5,272,236 A | 12/1993 | Lai et al. |
| 5,278,272 A | 1/1994 | Lai et al. |
| 5,504,172 A | 4/1996 | Imuta et al. |
| 5,708,083 A | 1/1998 | Kawamura et al. |
| 5,783,638 A | 7/1998 | Lai et al. |
| 5,919,983 A | 7/1999 | Rosen et al. |
| 5,986,028 A | 11/1999 | Lai et al. |
| 6,051,681 A | 4/2000 | Dozeman et al. |
| 6,103,657 A | 8/2000 | Murray |
| 6,320,005 B1 | 11/2001 | Murray |
| 6,525,157 B2 | 2/2003 | Cozewith et al. |
| 6,818,173 B1 | 11/2004 | Khait |
| 6,833,410 B2 | 12/2004 | Swain |
| 6,953,764 B2 | 10/2005 | Frazier et al. |
| 6,960,635 B2 | 11/2005 | Stevens et al. |
| 7,199,203 B2 | 4/2007 | Stevens et al. |
| 7,355,089 B2 | 4/2008 | Chang et al. |
| 7,608,668 B2 | 10/2009 | Li Pi Shan et al. |
| 7,858,706 B2 | 12/2010 | Arriola et al. |
| 7,893,166 B2 | 2/2011 | Shan et al. |
| 7,923,121 B2 | 4/2011 | Jackson et al. |
| 7,947,793 B2 | 5/2011 | Marchand et al. |
| 8,029,718 B2 | 10/2011 | O'Brien et al. |
| 2002/0003104 A1* | 1/2002 | Evanovich .......... B29C 41/06 210/153 |
| 2006/0199930 A1 | 9/2006 | Li Pi Shan et al. |
| 2007/0167578 A1 | 7/2007 | Arriola et al. |
| 2008/0269412 A1 | 10/2008 | Carnahan et al. |

(Continued)

FOREIGN PATENT DOCUMENTS

| CN | 100545205 C | 9/2009 |
|---|---|---|
| WO | 00/01745 A1 | 1/2000 |

(Continued)

OTHER PUBLICATIONS

D.J. Lohse, Polymer Blends vol. 1: Formulation, ed. D.R. Paul, C.B. Bucknall, 2000, pp. 219-237.
Dobrynin, "Phase coexistence in random copolymers", J. Chem. Phys. (1997) 107 (21), pp. 9234-9238.
Dow Global Technologies LLC, EP Appln. No. 14789454.7-1302, Rejection dated May 24, 2016.
Dow Global Technologies LLC, EP Appln. No. 14789454.7-1302, Response dated Nov. 18, 2016.
I.I. Potemkin, "Microphase separation in correlated random copolymers: Mean-field theory and flunctuation aorrections", Phys. Rev. E,. (1998), 57, 6902-6912.

(Continued)

*Primary Examiner* — Jeffrey Mullis

(57) ABSTRACT

A comprising includes one or more polyethylene, one or more polypropylene, one or more polyolefin elastomer, and a crystalline block composite having the following three components: (i) a crystalline ethylene based polymer, (ii) a crystalline propylene based polymer, and (iii) a block copolymer having a crystalline ethylene based block and a crystalline propylene block. The composition of component (i) is the same as the crystalline ethylene based block of the block copolymer and the composition of component (ii) is the same as the crystalline propylene block of the block copolymer. The composition is useful for forming rotomolded articles.

9 Claims, 4 Drawing Sheets

(56) References Cited

U.S. PATENT DOCUMENTS

| | | |
|---|---|---|
| 2008/0311812 A1 | 12/2008 | Arriola et al. |
| 2009/0105417 A1 | 4/2009 | Walton et al. |
| 2010/0093964 A1 | 4/2010 | Van Damme et al. |
| 2010/0285253 A1 | 11/2010 | Hughes et al. |
| 2011/0152499 A1 | 6/2011 | Winniford et al. |
| 2011/0313106 A1* | 12/2011 | Shan ............... C08L 23/10 525/88 |
| 2011/0313107 A1 | 12/2011 | Shan et al. |
| 2011/0313108 A1 | 12/2011 | Shan et al. |
| 2013/0177720 A1 | 7/2013 | Liang et al. |
| 2013/0183465 A1 | 7/2013 | Liang et al. |
| 2014/0343229 A1 | 11/2014 | Weeks et al. |

FOREIGN PATENT DOCUMENTS

| | | |
|---|---|---|
| WO | 02/38628 A2 | 5/2002 |
| WO | 03/040195 | 5/2003 |
| WO | 2005/090426 A1 | 9/2005 |
| WO | 2009/012215 A1 | 1/2009 |
| WO | 2009/067337 A1 | 5/2009 |
| WO | 2010/042304 A1 | 4/2010 |
| WO | 2011/041696 A1 | 4/2011 |
| WO | 2011/159649 A1 | 12/2011 |
| WO | 2011/163187 A1 | 12/2011 |
| WO | 2013/003541 A1 | 1/2013 |
| WO | 2013/003543 A1 | 1/2013 |
| WO | 2013/148035 A1 | 10/2013 |

OTHER PUBLICATIONS

PCT/US2014/059450, International Preliminary Report on Patentability issued Apr. 19, 2016.

PCT/US2014/059450, International Search Report & Written Opinion mailed Jan. 26, 2015.

Reichart, G.C. et al, "Thermodynamics of Mixing for Statistical Copolymers of Ethylene and a-Olefins", Macromolecules (1998), 31, 7886-7894.

Williams and Ward, "The construction of a polyethylene calibration curve for gel permeation chromatography using polystrene fractions", J. Polym. Sci., Polym. Let., (1968), vol. 6, pp. 621-624.

* cited by examiner

COMPATIBILIZED POLYOLEFIN BLENDS

FIELD

The invention relates to compatibilized polyolefin blends, and in particular, such blends used in rotomolding applications.

INTRODUCTION

Rotomolding or rotational molding involves adding an amount of material to a mold, heating and rotating the mold such that the material coats the walls of the mold, cooling the mold to produce a formed article and releasing the article. Traditionally, polyolefins used for such applications include polypropylene or polyethylene, and in particular MDPE, but generally not blends of these incompatible polymers. Blends of polypropylene and polyethylene generally result in the phases separating out causing poor mechanical properties such as impact resistance.

SUMMARY

Embodiments may be realized by providing a composition including one or more polyethylene, one or more polypropylene, one or more polyolefin elastomer, and a crystalline block composite having the following three components (i) a crystalline ethylene based polymer (CEP), (ii) a crystalline alpha-olefin based polymer (CAOP), and (iii) a block copolymer having a crystalline ethylene block (CEB) and a crystalline alpha-olefin block (CAOB). The CEB of the block copolymer is the same composition as the CEP in the block composite and the CAOB of the block copolymer is the same composition as the CAOP of the block composite.

DETAILED DESCRIPTION

Figure 1:
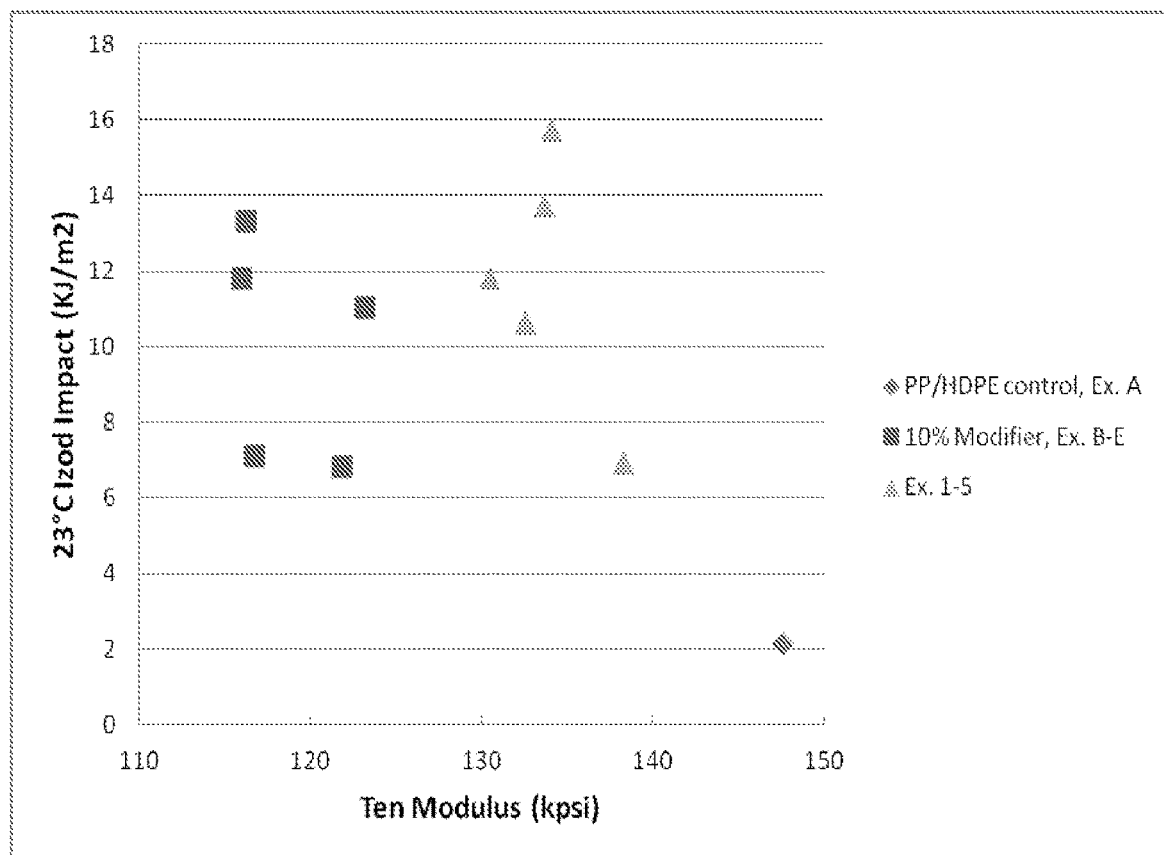
FIG. 1 shows Izod impact strength vs tensile modulus for Examples 1-5 and Comparative Examples A-E.

The invention provides a composition comprising one or more polyethylene, one or more polypropylene; one or more polyolefin elastomer; and a crystalline block composite comprising three components: (i) a crystalline ethylene based polymer (CEP), (ii) a crystalline alpha-olefin based polymer (CAOP), and (iii) a block copolymer having a crystalline ethylene block (CEB) and a crystalline alpha-olefin block (CAOB). The CEB of the block copolymer is the same composition as the CEP in the block composite and the CAOB of the block copolymer is the same composition as the CAOP of the block composite.

Polyethylene

Any polyethylene may be used in the invention. Preferably, the polyethylene is selected from ultralow density polyethylene (ULDPE), low density polyethylene (LDPE), linear low density polyethylene (LLDPE), medium density polyethylene (MDPE), high density polyethylene (HDPE), high melt strength high density polyethylene (HMS-HDPE), ultrahigh density polyethylene (UHDPE), and combinations thereof. Exemplary polyethylene is discussed in Publication Nos. WO 2010/042304, WO 2011/159649, and WO 2013/148035.

Exemplary ULDPEs are available from The Dow Chemical Company under the tradename ATTANE™, such as ATTANE™ 4201G, ATTANE™ 4203, and ATTANE™ 4404G. The ULDPE resins may be characterized as having a density between 0.89 g/cc to 0.915 g/cc. The ULDPEs may have a melt mass flow rate from 0.5 to 10.0 g/10 min. Exemplary LDPEs are available from The Dow Chemical Company under the tradename DOW™ Low Density Polyethylene (LDPE), such as DOW™ LDPE 1321, DOW™ LDPE 50041, and DOW™ LDPE PG 7004. LDPE resins may be characterized as having a density from 0.910 g/cc to 0.940 g/cc. The LDPE may have a melt mass flow rate from 0.2 to 100.0 g/10 min. Exemplary LLDPEs are available from The Dow Chemical Company under the tradename DOW™ Linear Low Density Polyethylene (LLDPE), such as DOW™ LLDPE DFDA-7047 NT7. LLDPE resins may be characterized as having a density from 0.915 g/cc to 0.925 g/cc and a substantially linear polymer (e.g., differ from LDPE due to minimization or exclusion of low chain branching). The LLDPE may have a melt mass flow rate from 0.2 to 50.0 g/10 min. MDPEs are available from The Dow Chemical Company under the tradename DOW™ Medium Density Polyethylene (MDPE), such as DOW™ MDPE 8818, DOW™ DMDA-8962 NT 7, and DOWLEX™ 2432E. MDPE resins may be characterized as having a density from 0.926 g/cc to 0.940 g/cc. HDPEs are available from The Dow Chemical Company under the tradename DOW™ High Density Polyethylene (HDPE), such as DOW™ HDPE 25055E and DOW™ HDPE KT 10000 UE, and under the tradename UNIVAL™, such as UNIVAL™ DMDD-6200 NT 7. The HDPE resins may be characterized as having a density greater than 0.940 g/cc (e.g., up to 0.970 g/cc). Exemplary embodiments include the HDPE having a density greater than 0.940 g/cc and/or greater than 0.950 g/cc and up to 0.970 g/cc. For example, the polyethylene component of the composition may consist essentially of HDPE.

Polypropylene

Any polypropylene may be used in the invention. The polypropylene may be in the form of a copolymer or a homopolymer. For example, the polypropylene is selected from random copolymer polypropylene (rcPP), impact copolymer polypropylene (hPP+at least one elastomeric impact modifier) (ICPP) or high impact polypropylene (HIPP), high melt strength polypropylene (HMS-PP), isotactic polypropylene (iPP), syndiotactic polypropylene (sPP), and combinations thereof. Exemplary polypropylene is discussed in Publication Nos. WO 2011/159649 and WO 2013/148035. Exemplary embodiments include a polypropylene homopolymer, e.g., the polypropylene component of the composition may consist essentially of the polypropylene homopolymer.

Crystalline Block Composite

The term "crystalline block composite" (CBC) refers to polymers having three components: a crystalline ethylene based polymer (CEP), a crystalline alpha-olefin based polymer (CAOP), and a block copolymer having a crystalline ethylene block (CEB) and a crystalline alpha-olefin block (CAOB), wherein the CEB of the block copolymer is the same composition as the CEP in the block composite and the CAOB of the block copolymer is the same composition as the CAOP of the block composite. Additionally, the compositional split between the amount of CEP and CAOP will be essentially the same as that between the corresponding blocks in the block copolymer. When produced in a continuous process, the crystalline block composites desirably possess PDI from 1.7 to 15, preferably 1.8 to 10, preferably from 1.8 to 5, more preferably from 1.8 to 3.5. Such crystalline block composites are described in, for example, US Patent Application Publication Nos 2011-0313106, 2011-0313108 and 2011-0313108, all published on Dec. 22, 2011, incorporated herein by reference with respect to descriptions of the crystalline block composites, processes to make them and methods of analyzing them. The term "block copolymer" or "segmented copolymer" refers to a polymer comprising two or more chemically distinct regions or segments (referred to as "blocks") joined in a linear manner, that is, a polymer comprising chemically differentiated units which are joined (covalently bonded) end-to-end with respect to polymerized functionality, rather than in pendent or grafted fashion. In a preferred embodiment, the blocks differ in the amount or type of comonomer incorporated therein, the density, the amount of crystallinity, the type of crystallinity (e.g. polyethylene versus polypropylene), the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The block copolymers of the invention are characterized by unique distributions of both polymer polydispersity (PDI or Mw/Mn) and block length distribution, due, in a preferred embodiment, to the effect of a shuttling agent(s) in combination with the catalyst(s) as further described below.

CAOB refers to highly crystalline blocks of polymerized alpha olefin units in which the monomer is present in an amount greater than 90 mol %, preferably greater than 93 mol percent, more preferably greater than 95 mol percent, and preferably greater than 96 mol percent. In other words, the comonomer content in the CAOBs is less than 10 mol percent, and preferably less than 7 mol percent, and more preferably less than 5 mol percent, and most preferably less than 4 mol %. CAOBs with propylene crystallinity have corresponding melting points that are 80° C. and above, preferably 100° C. and above, more preferably 115° C. and above, and most preferably 120° C. and above. In some embodiments, the CAOB comprise all or substantially all propylene units. CEB, on the other hand, refers to blocks of polymerized ethylene units in which the comonomer content is 10 mol % or less, preferably between 0 mol % and 10 mol %, more preferably between 0 mol % and 7 mol % and most preferably between 0 mol % and 5 mol %. Such CEB have corresponding melting points that are preferably 75° C. and above, more preferably 90° C., and 100° C. and above.

Preferably, the crystalline block composite polymers comprise propylene, 1-butene or 4-methyl-1-pentene and one or more comonomers. Preferably, the block composites comprise in polymerized form propylene and ethylene and/or one or more $C_{4-20}$ α-olefin comonomers, and/or one or more additional copolymerizable comonomers or they comprise 4-methyl-1-pentene and ethylene and/or one or more $C_{4-20}$ α-olefin comonomers, or they comprise 1-butene and ethylene, propylene and/or one or more $C_5$-$C_{20}$ α-olefin comonomers and/or one or more additional copolymerizable comonomers. Additional suitable comonomers are selected from diolefins, cyclic olefins, and cyclic diolefins, halogenated vinyl compounds, and vinylidene aromatic compounds. Preferably, the monomer is propylene and the comonomer is ethylene.

Comonomer content in the crystalline block composite polymers may be measured using any suitable technique, with techniques based on nuclear magnetic resonance (NMR) spectroscopy preferred.

The block composites and crystalline block composites preferably have a Tm greater than 100° C., preferably greater than 120° C., and more preferably greater than 125° C. Preferably the Tm is in the range of from 100° C. to 250° C., more preferably from 120° C. to 220° C. and also preferably in the range of from 125° C. to 220° C. Preferably the MFR of the block composites and crystalline block composites is from 0.1 to 1000 dg/min, more preferably from 0.1 to 50 dg/min and more preferably from 0.1 to 30 dg/min.

Further preferably, the block composites and crystalline block composites have a weight average molecular weight (Mw) from 10,000 to about 2,500,000, preferably from 35000 to about 1,000,000 and more preferably from 50,000 to about 300,000, preferably from 50,000 to about 200,000.

Preferably the crystalline block composite polymers of the invention comprise from 0.5 to 95 wt % CEP, from 0.5 to 95 wt % CAOP and from 5 to 99 wt % block copolymer. More preferably, the crystalline block composite polymers comprise from 0.5 to 79 wt % CEP, from 0.5 to 79 wt % CAOP and from 20 to 99 wt % block copolymer and more preferably from 0.5 to 49 wt % CEP, from 0.5 to 49 wt % CAOP and from 50 to 99 wt % block copolymer. Weight percents are based on total weight of crystalline block composite. The sum of the weight percents of CEP, CAOP and block copolymer equals 100%.

Preferably, the block copolymers of the crystalline block composite comprise from 5 to 95 weight percent crystalline ethylene blocks (CEB) and 95 to 5 wt percent crystalline alpha-olefin blocks (CAOB). They may comprise 10 wt % to 90 wt % CEB and 90 wt % to 10 wt % CAOB. More preferably, the block copolymers comprise 25 to 75 wt % CEB and 75 to 25 wt % CAOB, and even more preferably they comprise 30 to 70 wt % CEB and 70 to 30 wt % CAOB. According to an exemplary embodiment, block copolymers include from 40 wt % to 60 wt % of crystalline propylene blocks (e.g., of isotactic polypropylene), and a remainder of crystalline ethylene based blocks (e.g., of ethylene and propylene, in which at least 85 wt % thereof is ethylene), based on the total weight of the block copolymers.

In some embodiments, the crystalline block composites have a Crystalline Block Composite Index (CBCI), as defined below, that is greater than zero but less than about 0.4 or from about 0.1 to about 0.3. In other embodiments, CBCI is greater than about 0.4 and up to about 1.0. In some embodiments, the CBCI is in the range of from about 0.1 to about 0.9, from about 0.1 to about 0.8, from about 0.1 to about 0.7 or from about 0.1 to about 0.6. Additionally, the CBCI can be in the range of from about 0.4 to about 0.7, from about 0.5 to about 0.7, or from about 0.6 to about 0.9. In some embodiments, CBCI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, CBCI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

The block composite and crystalline block composite polymers are preferably prepared by a process comprising contacting an addition polymerizable monomer or mixture of monomers under addition polymerization conditions with a composition comprising at least one addition polymerization catalyst, a cocatalyst and a chain shuttling agent, said process being characterized by formation of at least some of the growing polymer chains under differentiated process conditions in two or more reactors operating under steady state polymerization conditions or in two or more zones of a reactor operating under plug flow polymerization conditions. The term, "shuttling agent" refers to a compound or mixture of compounds that is capable of causing polymeryl exchange between at least two active catalyst sites under the conditions of the polymerization. That is, transfer of a polymer fragment occurs both to and from one or more of the active catalyst sites. In contrast to a shuttling agent, a "chain transfer agent" causes termination of polymer chain growth and amounts to a one-time transfer of growing polymer from the catalyst to the transfer agent. In a preferred embodiment, the block composites and crystalline block composites comprise a fraction of block polymer which possesses a most probable distribution of block lengths.

Suitable processes useful in producing the block composites and crystalline block composites may be found, for example, in US Patent Application Publication No. 2008/0269412, published on Oct. 30, 2008, which is herein incorporated by reference. In particular, the polymerization is desirably carried out as a continuous polymerization, preferably a continuous, solution polymerization, in which catalyst components, monomers, and optionally solvent, adjuvants, scavengers, and polymerization aids are continuously supplied to one or more reactors or zones and polymer product continuously removed therefrom. Within the scope of the terms "continuous" and "continuously" as used in this context are those processes in which there are intermittent additions of reactants and removal of products at small regular or irregular intervals, so that, over time, the overall process is substantially continuous. The chain shuttling agent(s) may be added at any point during the polymerization including in the first reactor or zone, at the exit or slightly before the exit of the first reactor, or between the first reactor or zone and the second or any subsequent reactor or zone. Due to the difference in monomers, temperatures, pressures or other difference in polymerization conditions between at least two of the reactors or zones connected in series, polymer segments of differing composition such as comonomer content, crystallinity, density, tacticity, regio-regularity, or other chemical or physical difference, within the same molecule are formed in the different reactors or zones. The size of each segment or block is determined by continuous polymer reaction conditions, and preferably is a most probable distribution of polymer sizes.

When producing a block polymer having a crystalline ethylene block (CEB) and a crystalline alpha-olefin block (CAOB) in two reactors or zones it is possible to produce the CEB in the first reactor or zone and the CAOB in the second reactor or zone or to produce the CAOB in the first reactor or zone and the CEB in the second reactor or zone. It is more advantageous to produce CEB in the first reactor or zone with fresh chain shuttling agent added. The presence of increased levels of ethylene in the reactor or zone producing CEB will typically lead to much higher molecular weight in that reactor or zone than in the zone or reactor producing CAOB. The fresh chain shuttling agent will reduce the MW of polymer in the reactor or zone producing CEB thus leading to better overall balance between the length of the CEB and CAOB segments.

When operating reactors or zones in series it is necessary to maintain diverse reaction conditions such that one reactor produces CEB and the other reactor produces CAOB. Carryover of ethylene from the first reactor to the second reactor (in series) or from the second reactor back to the first reactor through a solvent and monomer recycle system is preferably minimized There are many possible unit operations to remove this ethylene, but because ethylene is more volatile than higher alpha olefins one simple way is to remove much of the unreacted ethylene through a flash step by reducing the pressure of the effluent of the reactor producing CEB and flashing off the ethylene. A more preferable approach is to avoid additional unit operations and to utilize the much greater reactivity of ethylene versus higher alpha olefins such that the conversion of ethylene across the CEB reactor approaches 100%. The overall conversion of monomers across the reactors can be controlled by maintaining the alpha olefin conversion at a high level (90 to 95%).

Suitable catalysts and catalyst precursors for use in the present invention include metal complexes such as disclosed in WO2005/090426, in particular, those disclosed starting on page 20, line 30 through page 53, line 20, which is herein incorporated by reference. Suitable catalysts are also disclosed in US 2006/0199930; US 2007/0167578; US 2008/0311812; U.S. Pat. No. 7,355,089 B2; or WO 2009/012215, which are herein incorporated by reference with respect to catalysts.

Particularly preferred catalysts are those of the following formula:

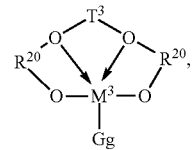

where:
$R^{20}$ is an aromatic or inertly substituted aromatic group containing from 5 to 20 atoms not counting hydrogen, or a polyvalent derivative thereof;
$T^3$ is a hydrocarbylene or silane group having from 1 to 20 atoms not counting hydrogen, or an inertly substituted derivative thereof;
$M^3$ is a Group 4 metal, preferably zirconium or hafnium;
G is an anionic, neutral or dianionic ligand group; preferably a halide, hydrocarbyl or dihydrocarbylamide group having up to 20 atoms not counting hydrogen;
g is a number from 1 to 5 indicating the number of such G groups; and
bonds and electron donative interactions are represented by lines and arrows respectively.

Preferably, such complexes correspond to the formula:

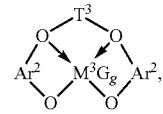

wherein: $T^3$ is a divalent bridging group of from 2 to 20 atoms not counting hydrogen, preferably a substituted or unsubstituted, $C_{3-6}$ alkylene group; and
$Ar^2$ independently each occurrence is an arylene or an alkyl- or aryl-substituted arylene group of from 6 to 20 atoms not counting hydrogen;
$M^3$ is a Group 4 metal, preferably hafnium or zirconium;
G independently each occurrence is an anionic, neutral or dianionic ligand group;

g is a number from 1 to 5 indicating the number of such X groups; and electron donative interactions are represented by arrows.

Preferred examples of metal complexes of foregoing formula include the following compounds:

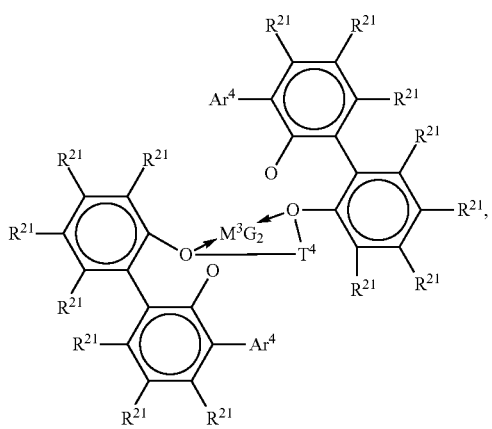

where $M^3$ is Hf or Zr;

$Ar^4$ is $C_{6-20}$ aryl or inertly substituted derivatives thereof, especially 3,5-di(isopropyl)phenyl, 3,5-di(isobutyl)phenyl, dibenzo-1H-pyrrole-1-yl, or anthracen-5-yl, and $T^4$ independently each occurrence comprises a $C_{3-6}$ alkylene group, a $C_{3-6}$ cycloalkylene group, or an inertly substituted derivative thereof;

$R^{21}$ independently each occurrence is hydrogen, halo, hydrocarbyl, trihydrocarbylsilyl, or trihydrocarbylsilylhydrocarbyl of up to 50 atoms not counting hydrogen; and G, independently each occurrence is halo or a hydrocarbyl or trihydrocarbylsilyl group of up to 20 atoms not counting hydrogen, or 2 G groups together are a divalent derivative of the foregoing hydrocarbyl or trihydrocarbylsilyl groups.

Especially preferred are compounds of the formula:

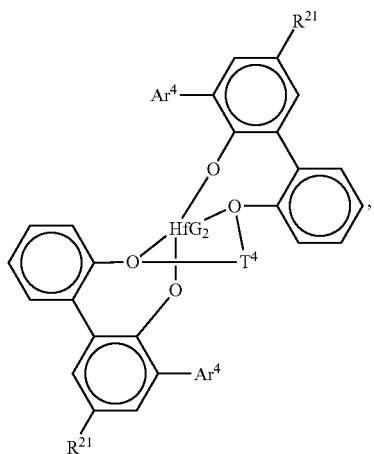

wherein $Ar^4$ is 3,5-di(isopropyl)phenyl, 3,5-di(isobutyl)phenyl, dibenzo-1H-pyrrole-1-yl, or anthracen-5-yl, $R^{21}$ is hydrogen, halo, or $C_{1-4}$ alkyl, especially methyl $T^4$ is propan-1,3-diyl or butan-1,4-diyl, and G is chloro, methyl or benzyl.

Other suitable metal complexes are those of the formula:

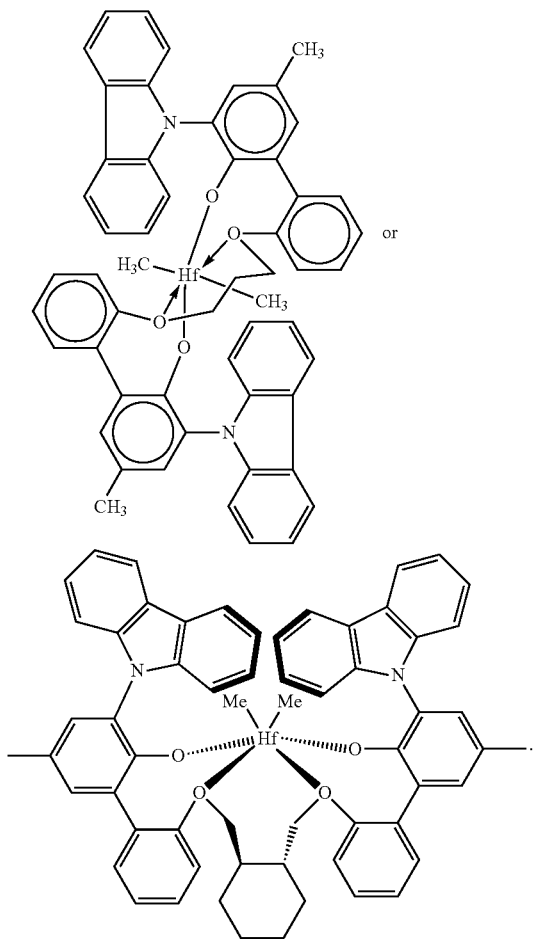

The foregoing polyvalent Lewis base complexes are conveniently prepared by standard metallation and ligand exchange procedures involving a source of the Group 4 metal and the neutral polyfunctional ligand source. In addition, the complexes may also be prepared by means of an amide elimination and hydrocarbylation process starting from the corresponding Group 4 metal tetraamide and a hydrocarbylating agent, such as trimethylaluminum. Other techniques may be used as well. These complexes are known from the disclosures of, among others, U.S. Pat. Nos. 6,320,005, 6,103,657, 6,953,764 and International Publication Nos WO 02/38628 and WO 03/40195.

Suitable co-catalysts are those disclosed in WO2005/090426, in particular, those disclosed on page 54, line 1 to page 60, line 12, which is herein incorporated by reference.

Suitable chain shuttling agents are those disclosed in WO2005/090426, in particular, those disclosed on page 19, line 21 through page 20 line 12, which is herein incorporated by reference. Particularly preferred chain shuttling agents are dialkyl zinc compounds.

Polyolefin Elastomers

The inventive composition also includes one or more polyolefin elastomers. The polyolefin elastomer can be a homogeneously branched ethylene/alpha-olefin copolymer. These copolymers can be made with a single-site catalyst such as a metallocene catalyst or constrained geometry catalyst, and typically have a melting point of less than 105, preferably less than 90, more preferably less than 85, even more preferably less than 80 and still more preferably less than 75° C. The melting point is measured by differential scanning calorimetry (DSC) as described, for example, in U.S. Pat. No. 5,783,638. The α-olefin is preferably a $C_{3-20}$ linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, are α-olefins and can be used in place of some or all of the α-olefins described above. Similarly, styrene and its related olefins (for example, α-methylstyrene, etc.) are α-olefins for purposes of this invention. Illustrative homogeneously branched ethylene/alpha-olefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, and ethylene/butene/styrene. More specific examples of homogeneously branched ethylene/alpha-olefin interpolymers useful in this invention include homogeneously branched, linear ethylene/α-olefin copolymers (e.g. TAFMER® by Mitsui Petrochemicals Company Limited and EXACT® by Exxon Chemical Company), and the homogeneously branched, substantially linear ethylene/α-olefin polymers (e.g., AFFINITY™ and ENGAGE™ polyethylene available from The Dow Chemical Company). The substantially linear ethylene copolymers are especially preferred, and are more fully described in U.S. Pat. Nos. 5,272,236, 5,278,272 and 5,986,028. Blends of any of these interpolymers can also be used in the practice of this invention. In the context of this invention, homogeneously branched ethylene/alpha-olefin interpolymers are not olefin block copolymers.

Olefin Block Copolymer

The term "olefin block copolymer" or "OBC" means an ethylene/α-olefin multi-block copolymer and includes ethylene and one or more copolymerizable α-olefin comonomer in polymerized form, characterized by multiple blocks or segments of two or more polymerized monomer units differing in chemical or physical properties. The terms "interpolymer" and "copolymer" are used interchangeably herein. When referring to amounts of "ethylene" or "comonomer" in the copolymer, it is understood that this means polymerized units thereof. In some embodiments, the multi-block copolymer can be represented by the following formula:

(AB)$_n$ where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows.

AAA-AA-BBB-BB

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole block copolymer, i.e., ethylene comprises at least 50 mole percent of the whole polymer. More preferably ethylene comprises at least 60 mole percent, at least 70 mole percent, or at least 80 mole percent, with the substantial remainder of the whole polymer comprising at least one other comonomer that is preferably an α-olefin having 3 or more carbon atoms. In some embodiments, the olefin block copolymer may comprise 50 mol % to 90 mol % ethylene, preferably 60 mol % to 85 mol %, more preferably 65 mol % to 80 mol %. For many ethylene/octene block copolymers, the preferred composition comprises an ethylene content greater than 80 mole percent of the whole polymer and an octene content of from 10 to 15, preferably from 15 to 20 mole percent of the whole polymer.

The olefin block copolymer includes various amounts of "hard" and "soft" segments. "Hard" segments are blocks of polymerized units in which ethylene is present in an amount greater than 95 weight percent, or greater than 98 weight percent based on the weight of the polymer, up to 100 weight percent. In other words, the comonomer content (content of monomers other than ethylene) in the hard segments is less than 5 weight percent, or less than 2 weight percent based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 weight percent, or greater than 8 weight percent, greater than 10 weight percent, or greater than 15 weight percent based on the weight of the polymer. In some embodiments, the comonomer content in the soft segments can be greater than 20 weight percent, greater than 25 weight percent, greater than 30 weight percent, greater than 35 weight percent, greater than 40 weight percent, greater than 45 weight percent, greater than 50 weight percent, or greater than 60 weight percent and can be up to 100 weight percent.

The soft segments can be present in an OBC from 1 weight percent to 99 weight percent of the total weight of the OBC, or from 5 weight percent to 95 weight percent, from 10 weight percent to 90 weight percent, from 15 weight percent to 85 weight percent, from 20 weight percent to 80 weight percent, from 25 weight percent to 75 weight percent, from 30 weight percent to 70 weight percent, from 35 weight percent to 65 weight percent, from 40 weight percent to 60 weight percent, or from 45 weight percent to 55 weight percent of the total weight of the OBC. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, entitled "Ethylene/α-Olefin Block Inter-polymers," filed on Mar. 15, 2006, in the name of Colin L. P. Shan, Lonnie Hazlitt, et. al. and assigned to Dow Global Technologies Inc., the disclosure of which is incorporated by reference herein in its entirety. In particular, hard and soft segment weight percentages and comonomer content may be determined as described in Column 57 to Column 63 of U.S. Pat. No. 7,608,668.

The olefin block copolymer is a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present OBC is characterized by unique distributions of both polymer polydispersity (PDI or Mw/Mn or MWD), block length distribution, and/or block number distribution, due, in an embodiment, to the effect of the shuttling agent(s) in combination with multiple catalysts used in their preparation.

In an embodiment, the OBC is produced in a continuous process and possesses a polydispersity index, PDI, from 1.7 to 3.5, or from 1.8 to 3, or from 1.8 to 2.5, or from 1.8 to 2.2. When produced in a batch or semi-batch process, the OBC possesses PDI from 1.0 to 3.5, or from 1.3 to 3, or from 1.4 to 2.5, or from 1.4 to 2.

In addition, the olefin block copolymer possesses a PDI fitting a Schultz-Flory distribution rather than a Poisson distribution. The present OBC has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the present olefin block copolymer possesses a most probable distribution of block lengths. In an embodiment, the olefin block copolymer is defined as having:

(A) Mw/Mn from 1.7 to 3.5, at least one melting point, Tm, in degrees Celsius, and a density, d, in grams/cubic centimeter, where in the numerical values of Tm and d correspond to the relationship:

$Tm > -2002.9 + 4538.5(d) - 2422.2(d)^2$, and/or (B) Mw/Mn from 1.7 to 3.5, and is characterized by a heat of fusion, $\Delta H$ in J/g, and a delta quantity, $\Delta T$, in degrees Celsius defined as the temperature difference between the tallest DSC peak and the tallest Crystallization Analysis Fractionation ("CRYSTAF") peak, wherein the numerical values of $\Delta T$ and $\Delta H$ have the following relationships:

$\Delta T > -0.1299 \Delta H + 62.81$ for $\Delta H$ greater than zero and up to 130 J/g $\Delta T \geq 48°$ C. for $\Delta H$ greater than 130 J/g wherein the CRYSTAF peak is determined using at least 5 percent of the cumulative polymer, and if less than 5 percent of the polymer has an identifiable CRYSTAF peak, then the CRYSTAF temperature is 30° C.; and/or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$Re > 1481 - 1629(d)$; and/or (D) has a molecular fraction which elutes between 40° C. and 130° C. when fractionated using TREF, characterized in that the fraction has a molar comonomer content greater than, or equal to, the quantity (−0.2013) T+20.07, more preferably greater than or equal to the quantity (−0.2013) T+21.07, where T is the numerical value of the peak elution temperature of the TREF fraction, measured in ° C.; and/or, (E) has a storage modulus at 25° C., G' (25° C.), and a storage modulus at 100° C., G'(100° C.), wherein the ratio of G' (25° C.) to G' (100° C.) is in the range of 1:1 to 9:1.

The olefin block copolymer may also have:

(F) a molecular fraction which elutes between 40° C. and 130° C. when fractionated using TREF, characterized in that the fraction has a block index of at least 0.5 and up to 1 and a molecular weight distribution, Mw/Mn, greater than 1.3; and/or (G) average block index greater than zero and up to 1.0 and a molecular weight distribution, Mw/Mn greater than 1.3.

It is understood that the olefin block copolymer may have one, some, all, or any combination of properties (A)-(G). Block Index can be determined as described in detail in U.S. Pat. No. 7,608,668 herein incorporated by reference for that purpose. Analytical methods for determining properties (A) through (G) are disclosed in, for example, U.S. Pat. No. 7,608,668, Col. 31, line 26 through Col. 35, line 44, which is herein incorporated by reference for that purpose.

Suitable monomers for use in preparing the present OBC include ethylene and one or more addition polymerizable monomers other than ethylene. Examples of suitable comonomers include straight-chain or branched α-olefins of 3 to 30, preferably 3 to 20, carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, preferably 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

The olefin block copolymer has a density of from 0.850 g/cc to 0.925 g/cc, or from 0.860 g/cc to 0.88 g/cc or from 0.860 g/cc to 0.879 g/cc. The OBC has a Shore A value of 40 to 70, preferably from 45 to 65 and more preferably from 50 to 65. In an embodiment, the olefin block copolymer has a melt index (MI) from 0.1 g/10 min to 30 g/10, or from 0.1 g/10 min to 20 g/10 min, or from 0.1 g/10 min to 15 g/10 min, as measured by ASTM D 1238 (190° C./2.16 kg). The olefin block copolymer is present in an amount of 1 wt % to 45 wt %, preferably 2 wt % to 30 wt %, more preferably 5 wt % to 25 wt %. For example, the range is 10 wt % to 25 wt % and/or 14.5 wt % to 20.5 wt %. The composition may comprise more than one olefin block copolymer. The olefin block copolymer may also be present in an amount of from 1 wt % to 20 wt %. All weight percents are based on total weight of the composition.

The OBCs of the current invention can also be 'mesophase separated' meaning that the polymeric blocks are locally segregated to form ordered mesodomains. Crystallization of the ethylene segments in these systems is primarily constrained to the resulting mesodomains. These mesodomains can take the form of spheres, cylinders, lamellae, or other morphologies known for block copolymers. Such OBCs and processes to make them are disclosed in, for example, U.S. Pat. No. 7,947,793, which is herein incorporated by reference. The narrowest dimension of a domain, such as perpendicular to the plane of lamellae, is generally greater than about 40 nm in the mesophase separated block copolymers of the instant invention. Domain sizes are typically in the range of from about 40 nm to about 300 nm, preferably in the range of from about 50 nm to about 250 nm, and more preferably in the range of from about 60 nm to about 200 nm, as measured by the smallest dimension such as perpendicular to the plane of lamellae or the diameter of spheres or cylinders. In addition, domains may have smallest dimensions that are greater than about 60 nm, greater than about 100 nm, and greater than about 150 nm. The mesophase separated polymers comprise olefin block copolymers wherein the amount of comonomer in the soft segments as compared to that in the hard segments is such that the block copolymer undergoes mesophase separation in the melt. The required amount of comonomer may be measured in mole percent and varies with each comonomer. A calculation may be made for any desired comonomer in order to determine the amount required to achieve mesophase separation. The minimum level of incompatibility, expressed as XN, to achieve mesophase separation in these polydisperse block copolymers is predicted to be XN=2.0 (I. I. Potemkin, S. V. Panyukov, *Phys. Rev. E.* 57, 6902 (1998)). Recognizing that fluctuations usually push the order-disorder transition in commercial block copolymers to slightly higher XN, a value XN=2.34 has been used as the minimum in the calculations below. Following the approach of D. J. Lohse, W. W. Graessley, *Polymer Blends Volume* 1: *Formulation*, ed. D. R. Paul, C. B. Bucknall, 2000, XN can be converted to the product of p/v and M/p where v is a reference volume, M is the number average block molecular weight and p is the melt density. The melt density is taken to be 0.78 g/cm³ and a typical value of block molecular weight is approximately 25,500 g/mol based on a diblock at an overall molecular weight of 51,000 g/mol. p/v for cases in which the comonomer is butene or propylene is determined using 130° C. as the temperature and then performing an interpolation or extrapolation of the data provided in Table 8.1 in the reference by Lohse and Graessley. For each comonomer type, a linear regression in mole percent comonomer was performed. For cases in which octene is the comonomer, the same procedure was performed with the data of Reichart, G. C. et al, *Macromolecules* (1998), 31, 7886. The entanglement molecular weight at 413 K (about 140° C.) in kg/mol is taken to be 1.1. Using these parameters, the minimum difference in comonomer content is determined to be, respectively, 20.0, 30.8 or 40.7 mole percent when the comonomer is octene, butene, or propylene. In some embodiments, the difference in comonomer content is greater than 18.5 mole percent. In some instances, films of the mesophase separated ethylene/α-olefin interpolymers reflect light across a band of wavelengths in the range between about 200 nm to about 1200 nm. For example, certain films appear blue via reflected light but yellow via transmitted light. Other compositions reflect light in the ultraviolet (UV) range, from about 200 nm to about 400 nm, while others reflect light in the infrared (IR) range, from about 750 nm to about 1000 nm.

In some embodiments, the mesophase separated olefin block copolymers are characterized by an average molecular weight of greater than 40,000 g/mol, a molecular weight distribution, Mw/Mn, in the range of from about 1.4 to about 2.8, and a difference in mole percent α-olefin content between the soft block and the hard block of greater than about 18.5 mole percent. In some embodiments, the OBCs have a Block Index of 0.1 to 1.0.

In some embodiments, the olefin block copolymer has a density of from 0.850 g/cc to 0.925 g/cc, or from 0.860 g/cc to 0.88 g/cc or from 0.860 g/cc to 0.879 g/cc. In some embodiments, the OBC has a Shore A value of 40 to 70, preferably from 45 to 65 and more preferably from 50 to 65. In an embodiment, the olefin block copolymer has a melt index (MI) from 0.1 g/10 min to 30 g/10, or from 0.1 g/10 min to 20 g/10 min, or from 0.1 g/10 min to 15 g/10 min, as measured by ASTM D 1238 (190° C./2.16 kg). The olefin block copolymer is present in an amount of 1 wt % to 45 wt %, preferably 2 wt % to 30 wt %, more preferably 5 wt % to 25 wt %. The composition may comprise more than one olefin block copolymer. The olefin block copolymer may also be present in an amount of from 1 wt % to 20 wt %. All weight percents are based on total weight of the composition.

The olefin block copolymers are produced via a chain shuttling process such as described in U.S. Pat. No. 7,858, 706, which is herein incorporated by reference. In particular, suitable chain shuttling agents and related information are listed in Col. 16, line 39 through Col. 19, line 44. Suitable catalysts are described in Col. 19, line 45 through Col. 46, line 19 and suitable co-catalysts in Col. 46, line 20 through Col. 51 line 28. The process is described throughout the document, but particularly in Col. Col 51, line 29 through Col. 54, line 56. The process is also described, for example, in the following: U.S. Pat. Nos. 7,608,668; 7,893,166; and 7,947,793.

The olefin block copolymers can be produced via a chain shuttling process such as described in U.S. Pat. No. 7,858, 706, which is herein incorporated by reference. In particular, suitable chain shuttling agents and related information are listed in Col. 16, line 39 through Col. 19, line 44. Suitable catalysts are described in Col. 19, line 45 through Col. 46, line 19 and suitable co-catalysts in Col. 46, line 20 through Col. 51 line 28. The process is described throughout the document, but particularly in Col. Col 51, line 29 through Col. 54, line 56. The process is also described, for example, in the following: U.S. Pat. Nos. 7,608,668; 7,893,166; and U.S. Pat. No. 7,947,793.

Polypropylene Based Elastomer

The propylene-alpha-olefin interpolymer is characterized as having substantially isotactic propylene sequences. The propylene-alpha-olefin interpolymers include propylene-based elastomers (PBE). "Substantially isotactic propylene sequences" means that the sequences have an isotactic triad (mm) measured by $^{13}$C NMR of greater than 0.85; in the alternative, greater than 0.90; in another alternative, greater than 0.92; and in another alternative, greater than 0.93. Isotactic triads are well-known in the art and are described in, for example, U.S. Pat. No. 5,504,172 and International Publication No. WO 00/01745, which refers to the isotactic sequence in terms of a triad unit in the copolymer molecular chain determined by $^{13}$C NMR spectra.

The propylene/alpha-olefin interpolymer may have a melt flow rate in the range of from 0.1 to 500 grams per 10 minutes (g/10 min), measured in accordance with ASTM D-1238 (at 230° C./2.16 Kg). All individual values and subranges from 0.1 to 500 g/10 min are included herein and disclosed herein; for example, the melt flow rate can be from a lower limit of 0.1 g/10 min, 0.2 g/10 min, or 0.5 g/10 min to an upper limit of 500 g/10 min, 200 g/10 min, 100 g/10 min, or 25 g/10 min. For example, the propylene/alpha-olefin copolymer may have a melt flow rate in the range of from 0.1 to 200 g/10 min; or in the alternative, the propylene/alpha-olefin copolymer may have a melt flow rate in the range of from 0.2 to 100 g/10 min; or in the alternative, the propylene/alpha-olefin copolymer may have a melt flow rate in the range of from 0.2 to 50 g/10 min; or in the alternative, the propylene/alpha-olefin copolymer may have a melt flow rate in the range of from 0.5 to 50 g/10 min; or in the alternative, the propylene/alpha-olefin copolymer may have a melt flow rate in the range of from 1 to 50 g/10 min; or in the alternative, the propylene/alpha-olefin copolymer may have a melt flow rate in the range of from 1 to 40 g/10 min; or in the alternative, the propylene/alpha-olefin interpolymer may have a melt flow rate in the range of from 1 to 30 g/10 min.

The propylene/alpha-olefin interpolymer has crystallinity in the range of from at least 1 percent by weight (a heat of fusion (Hf) of at least 2 Joules/gram (J/g)) to 30 percent by weight (a Hf of less than 50 J/g). All individual values and subranges from 1 percent by weight (a Hf of at least 2 J/g) to 30 percent by weight (a Hf of less than 50 J/g) are included herein and disclosed herein; for example, the crystallinity can be from a lower limit of 1 percent by weight (a Hf of at least 2 J/g), 2.5 percent (a Hf of at least 4 J/g), or 3 percent (a Hf of at least 5 J/g) to an upper limit of 30 percent by weight (a Hf of less than 50 J/g), 24 percent by weight (a Hf of less than 40 J/g), 15 percent by weight (a Hf of less than 24.8 J/g) or 7 percent by weight (a Hf of less than 11 J/g). For example, the propylene/alpha-olefin copolymer may have a crystallinity in the range of from at least 1 percent by weight (a Hf of at least 2 J/g) to 24 percent by weight (a Hf of less than 40 J/g); or in the alternative, the propylene/alpha-olefin copolymer may have a crystallinity in the range of from at least 1 percent by weight (a Hf of at least 2 J/g to 15 percent by weight (a Hf of less than 24.8 J/g); or in the alternative, the propylene/alpha-olefin copolymer may have a crystallinity in the range of from at least 1 percent by weight (a Hf of at least 2 J/g) to 7 percent by weight (a Hf of less than 11 J/g); or in the alternative, the propylene/alpha-olefin copolymer may have a crystallinity in the range of Hf of less than 8.3 J/g). The crystallinity is measured by differential scanning calorimetry (DSC) as described in U.S. Pat. No. 7,199,203. The propylene/alpha-olefin copolymer comprises units derived from propylene and polymeric units derived from one or more alpha-olefin comonomers. Exemplary comonomers utilized to manufacture the propylene/alpha-olefin copolymer are $C_2$ and $C_4$ to $C_{10}$ alpha-olefins; for example, $C_2$, $C_4$, $C_6$ and $C_8$ alpha-olefins.

The propylene/alpha-olefin interpolymer comprises from 1 to 40 percent by weight of one or more alpha-olefin comonomers. All individual values and subranges from 1 to 40 weight percent are included herein and disclosed herein; for example, the comonomer content can be from a lower limit of 1 weight percent, 3 weight percent, 4 weight percent, 5 weight percent, 7 weight percent, or 9 weight percent to an upper limit of 40 weight percent, 35 weight percent, 30 weight percent, 27 weight percent, 20 weight percent, 15 weight percent, 12 weight percent, or 9 weight percent. For example, the propylene/alpha-olefin copolymer comprises from 1 to 35 percent by weight of one or more alpha-olefin comonomers; or in the alternative, the propylene/alpha-olefin copolymer comprises from 1 to 30 percent by weight of one or more alpha-olefin comonomers; or in the alternative, the propylene/alpha-olefin copolymer comprises from 3 to 27 percent by weight of one or more alpha-olefin comonomers; or in the alternative, the propylene/alpha-olefin copolymer comprises from 3 to 20 percent by weight of one or more alpha-olefin comonomers; or in the alternative, the propylene/alpha-olefin copolymer comprises from 3 to 15 percent by weight of one or more alpha-olefin comonomers.

The propylene/alpha-olefin interpolymer has a density of typically less than 0.895 $g/cm^3$; or in the alternative, less than 0.890 $g/cm^3$; or in the alternative, less than 0.880 $g/cm^3$; or in the alternative, less than 0.870 $g/cm^3$. The propylene/alpha-olefin interpolymer has a density of typically greater than 0.855 $g/cm^3$; or in the alternative, greater than 0.860 $g/cm^3$; or in the alternative, greater than 0.865 $g/cm^3$.

The propylene/alpha-olefin interpolymer has a melting temperature (Tm) typically of less than 120° C.; or in the alternative, <100° C.; or in the alternative, <90° C.; or in the alternative, <80° C.; or in the alternative, <70° C.; and a heat of fusion (Hf) typically of less than 70 Joules per gram (J/g) as measured by differential scanning calorimetry (DSC) as described in U.S. Pat. No. 7,199,203.

The propylene/alpha-olefin interpolymer has a molecular weight distribution (MWD), defined as weight average molecular weight divided by number average molecular weight ($M_w/M_n$) of 3.5 or less; or 3.0 or less; or from 1.8 to 3.0.

Such propylene/alpha-olefin interpolymers are further described in the U.S. Pat. Nos. 6,960,635 and 6,525,157. Such propylene/alpha-olefin interpolymers are commercially available from The Dow Chemical Company, under the trade name VERSIFY, or from ExxonMobil Chemical Company, under the trade name VISTAMAXX.

In one embodiment, the propylene/alpha-olefin interpolymers are further characterized as comprising (A) between 60 and less than 100, preferably between 80 and 99 and more preferably between 85 and 99, weight percent units derived from propylene, and (B) between greater than zero and 40, preferably between 1 and 20, more preferably between 4 and 16 and even more preferably between 4 and 15, weight percent units derived from at least one of ethylene and/or a $C_{4-10}$ α-olefin; and containing an average of at least 0.001, preferably an average of at least 0.005 and more preferably an average of at least 0.01, long chain branches/1000 total carbons. The maximum number of long chain branches in the propylene/alpha-olefin copolymer is not critical, but typically it does not exceed 3 long chain branches/1000 total carbons. The term long chain branch, as used herein with regard to propylene/alpha-olefin copolymers, refers to a chain length of at least one (1) carbon more than a short chain branch, and short chain branch, as used herein with regard to propylene/alpha-olefin copolymers, refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. Such propylene/alpha-olefin copolymers are further described in details in the U.S. Patent Publication No. 2010-0285253 and International Patent Publication No. WO 2009/067337.

Additives

Compositions, including thermoplastic blends according to the invention may also contain anti-ozonants or anti-oxidants that are known to a rubber chemist of ordinary skill. The anti-ozonants may be physical protectants such as waxy materials that come to the surface and protect the part from oxygen or ozone or they may be chemical protectors that react with oxygen or ozone. Suitable chemical protectors include styrenated phenols, butylated octylated phenol, butylated di(dimethylbenzyl) phenol, p-phenylenediamines, butylated reaction products of p-cresol and dicyclopentadiene (DCPD), polyphenolic anitioxidants, hydroquinone derivatives, quinoline, diphenylene antioxidants, thioester antioxidants, and blends thereof. Some representative trade names of such products are Wingstay™ S antioxidant, Polystay™ 100 antioxidant, Polystay™ 100 AZ antioxidant, Polystay™ 200 antioxidant, Wingstay™ L antioxidant, Wingstay™ LHLS antioxidant, Wingstay™ K antioxidant, Wingstay™ 29 antioxidant, Wingstay™ SN-1 antioxidant, and Irganox™ antioxidants. In some applications, the anti-oxidants and anti-ozonants used will preferably be non-staining and non-migratory.

For providing additional stability against UV radiation, hindered amine light stabilizers (HALS) and UV absorbers may be also used. Suitable examples include Tinuvin™ 123, Tinuvin™ 144, Tinuvin™ 622, Tinuvin™ 765, Tinuvin™ 770, and Tinuvin™ 780, available from Ciba Specialty Chemicals, and Chemisorb™ T944, available from Cytex Plastics, Houston Tex., USA. A Lewis acid may be additionally included with a HALS compound in order to achieve superior surface quality, as disclosed in U.S. Pat. No. 6,051,681.

For some compositions, additional mixing process may be employed to pre-disperse the anti-oxidants, anti-ozonants, carbon black, UV absorbers, and/or light stabilizers to form a masterbatch, and subsequently to form polymer blends there from.

Anti-Warping Agents

Polar functional polyolefins can be added to compositions to mitigate warpage of rotomolded parts. Such polyolefins may include ethylene copolymers with suitable comonomers such as maleic anhydride, vinyl acetate, $\alpha,\beta$-ethylenically unsaturated mono- or dicarboxylic acids, and combinations thereof, glycidyl methacrylate, ethyl acrylate, or butyl acrylate. The copolymers of LDPE containing $\alpha,\beta$-ethylenically unsaturated mono- or dicarboxylic acids may be neutralized in a post polymerization process with metal ions and compounds of alkali metals, alkaline earth metals, and transition metals; and combinations thereof. Particular cation sources include, but are not limited to, metal ions and compounds of lithium, sodium, potassium, magnesium, cesium, calcium, barium, manganese, copper, zinc, tin, rare earth metals, and combinations thereof. Polar functional polyolefins also include polyolefins derived from grafting copolymers such maleic anhydride grafted polyethylene or polypropylene.

Nucleation agents or clarifiers can also be added to the compositions to reduce warpage or increase cycle time. Such nucleation agents may include Bis(4-propylbenzylidene) propyl sorbitol such as MILLAD® NX8000, 1,3:2,4-Bis(3, 4-Dimethylbenzylidene) Sorbitol such as MILLAD® 3988i, Bicyclo[2.2.1]Heptane-2,3-Dicarboxylic Acid (Disodium Salt) such as Hyperform® HPN-68L, 1,2-Cyclohexanedicarboxylic Acid, Calcium Salt/Zinc Stearate 66/34 such as Hyperform® HPN-20E.

Compositions

In embodiments of the invention, the polyethylene has a density of 0.935-0.965 g/cm$^3$; I$_2$ (@ 190° C.) 0.5-30 g/10 min; and can be heterogeneous PE or homogeneous PE and is present in an amount of from 20-90 wt % based on total weight of the composition; the polypropylene has an MFR (@ 230° C.) 2-50 g/10 min, can be homo-PP, RCP and ICP and can be heterogeneous or homogeneous PP and is present in an amount of 10 to 80 wt % based on total weight of the composition; the polyolefin elastomer can have MI (@190° C.) 0.2-30 and Density <0.880 g/cm3, preferably <=0.870 g/cm3 and is present in an amount of 2-20 wt % based on total weight of the composition; and the crystalline block composite has an MFR (@ 230° C.) 3-60 g/10 min; density 0.900-0.920 g/cm$^3$, the crystalline alpha olefin copolymer and corresponding block are C$_3$+$\alpha$-olefin (0-10 wt %; preferably C$_2$), the crystalline ethylene based polymer and corresponding block preferably have propylene as the comonomer with >85 wt % derived from ethylene monomer and have a split between the CAOP and CEB of 50 wt %, based on weight of the block composite, preferably the CBC is present in the composition in an amount of 2-10 wt % based on total weight of the composition.

In a further description of exemplary embodiments, the one or more polyethylene may account for 25 wt % to 70 wt % (e.g., 30 wt % to 55 wt %, 30 wt % to 45 wt %, 35 wt % to 40 wt %, etc.) of a total weight of the composition. The one or more polypropylene may account for 35 wt % to 70 wt % (40 wt % to 65 wt %, 45 wt % to 60 wt %, 50 wt % to 55 wt %, etc.) of the total weight of the composition. The crystalline block composite may account for 0.5 wt % to 20.0 wt % (1 wt % to 15 wt %, 1 wt % to 10 wt %, 3 wt % to 8 wt %, etc.) of the total weight of the composition. The one or more polyolefin elastomer may account for 0.5 wt % to 20.0 wt % (1 wt % to 15 wt %, 1 wt % to 10 wt %, 3 wt % to 8 wt %, etc.) of the total weight of the composition. This composition is useful in applications including molding, and in particular, rotational molding or rotomolding.

Rotomolded Articles

Rotomolding or rotational molding involves adding an amount of material to a mold, heating and rotating the mold such that the material coats the walls of the mold, cooling the mold to produce a formed article and releasing the article. One-piece hollow articles can be made via rotomolding. Examples of rotomolded articles include but are not limited to toys, furniture, containers, for example tanks and watering cans, and sporting goods, for example canoes and kayaks.

Test Methods

Differential Scanning Calorimetry (DSC)

Differential Scanning calorimetry is performed on a TA Instruments Q1000 DSC equipped with an RCS cooling accessory and an auto sampler. A nitrogen purge gas flow of 50 ml/min is used. The sample is pressed into a thin film and melted in the press at about 190° C. and then air-cooled to room temperature (25° C.). About 3-10 mg of material is then cut, accurately weighed, and placed in a light aluminum pan (ca 50 mg) which is later crimped shut. The thermal behavior of the sample is investigated with the following temperature profile: the sample is rapidly heated to 190° C. and held isothermal for 3 minutes in order to remove any previous thermal history. The sample is then cooled to −90° C. at 10° C./min cooling rate and held at −90° C. for 3 minutes. The sample is then heated to 150° C. at 10° C./min heating rate. The cooling and second heating curves are recorded.

$^{13}$C Nuclear Magnetic Resonance (NMR)

Sample Preparation

The samples are prepared by adding approximately 2.7 g of a 50/50 mixture of tetrachloroethane-d2/orthodichlorobenzene that is 0.025M in chromium acetylacetonate (relaxation agent) to 0.21 g sample in a 10 mm NMR tube. The samples are dissolved and homogenized by heating the tube and its contents to 150° C.

Data Acquisition Parameters

The data is collected using a Bruker 400 MHz spectrometer equipped with a Bruker Dual DUL high-temperature CryoProbe. The data is acquired using 320 transients per data file, a 7.3 sec pulse repetition delay (6 sec delay+1.3 sec acq. time), 90 degree flip angles, and inverse gated decoupling with a sample temperature of 125° C. All measurements are made on non spinning samples in locked mode. Samples are homogenized immediately prior to insertion into the heated (130° C.) NMR Sample changer, and are allowed to thermally equilibrate in the probe for 15 minutes prior to data acquisition.

Gel Permeation Chromatography (GPC)

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.,* 6, 621 (1968)): $M_{polypropylene}=0.645(M_{polystyrene})$.

Polypropylene equivalent molecular weight calculations are performed using Viscotek TriSEC software Version 3.0.

Fast-Temperature Rising Elution Fractionation (F-TREF)

In F-TREF analysis, the composition to be analyzed is dissolved in orthodichlorobenzene and allowed to crystallize in a column containing an inert support (stainless steel shot) by slowly reducing the temperature to 30° C. (at a preferred rate of 0.4° C./min). The column is equipped with an infra-red detector. An F-TREF chromatogram curve is then generated by eluting the crystallized polymer sample from the column by slowly increasing the temperature of the eluting solvent (o-dichlorobenzene) from 30 to 140° C. (at a preferred rate of 1.5° C./min)

High Temperature Liquid Chromatography (HTLC)

HTLC is performed according to the methods disclosed in US Patent Application Publication No. 2010-0093964 and US Patent Application Publication No. 2011-152499, both of which are herein incorporated by reference. Samples are analyzed by the methodology described below.

A Waters GPCV2000 high temperature SEC chromatograph was reconfigured to build the HT-2DLC instrumentation. Two Shimadzu LC-20AD pumps were connected to the injector valve in GPCV2000 through a binary mixer. The first dimension (D1) HPLC column was connected between the injector and a 10-port switch valve (Valco Inc). The second dimension (D2) SEC column was connected between the 10-port valve and LS (Varian Inc.), IR (concentration and composition), RI (refractive index), and IV (intrinsic viscosity) detectors. RI and IV were built-in detector in GPCV2000. The IR5 detector was provided by Polymer-Char, Valencia, Spain.

Columns: The D1 column was a high temperature Hypercarb graphite column (2.1×100 mm) purchased from Thermo Scientific. The D2 column was a PLRapid-H column purchased from Varian (10×100 mm).

Reagents: HPLC grade trichlorobenzene (TCB) was purchased from Fisher Scientific. 1-Decanol and decane were from Aldrich. 2,6-Di-tert-butyl-4-methylphenol (Ionol) was also purchased from Aldrich.

Sample Preparation: 0.01-0.15 g of polyolefin sample was placed in a 10-mL Waters autosampler vial. 7-mL of either 1-decanol or decane with 200 ppm Ionol was added to the vial afterwards. After sparging helium to the sample vial for about 1 min, the sample vial was put on a heated shaker with temperature set at 160° C. The dissolution was done by shaking the vial at the temperature for 2 hr. The vial was then transferred to the autosampler for injection. Please note that the actual volume of the solution was more than 7 mL due to the thermal expansion of the solvent.

HT-2DLC: The D1 flow rate was at 0.01 mL/min. The composition of the mobile phase was 100% of the weak eluent (1-decanol or decane) for the first 10 min of the run. The composition was then increased to 60% of strong eluent (TCB) in 489 min. The data were collected for 489 min as the duration of the raw chromatogram. The 10-port valve switched every three minutes yielding 489/3=163 SEC chromatograms. A post-run gradient was used after the 489 min data acquisition time to clean and equilibrate the column for the next run:

Clean Step:
1. 490 min: flow=0.01 min; // Maintain the constant flow rate of 0.01 mL/min from 0-490 min.
2. 491 min: flow=0.20 min; // Increase the flow rate to 0.20 mL/min
3. 492 min. % B=100; // Increase the mobile phase composition to 100% TCB
4. 502 min. % B=100; // Wash the column using 2 mL of TCB Equilibrium Step:
5. 503 min. % B=0; // Change the mobile phase composition to 100% of 1-decanol or decane
6. 513 min. % B=0; // Equilibrate the column using 2 mL of weak eluent
7. 514 min: flow=0.2 mL/min; // Maintain the constant flow of 0.2 mL/min from 491-514 min
8. 515 min: flow=0.01 mL/min; // Lower the flow rate to 0.01 mL/min.

After step 8, the flow rate and mobile phase composition were the same as the initial conditions of the run gradient.

The D2 flow rate was at 2.51 mL/min Two 60 μL loops were installed on the 10-port switch valve. 30-μL of the eluent from D1 column was loaded onto the SEC column with every switch of the valve.

The IR, LS15 (light scattering signal at 15°), LS90 (light scattering signal at) 90°, and IV (intrinsic viscosity) signals were collected by EZChrom through a SS420X analogue-to-digital conversion box. The chromatograms were exported in ASCII format and imported into a home-written MATLAB software for data reduction. Using an appropriate calibration curve of polymer composition and retention volume, of polymers that are of similar nature of the hard block and soft block contained in the block composite being analyzed. Calibration polymers should be narrow in composition (both molecular weight and chemical composition) and span a reasonable molecular weight range to cover the composition of interest during the analysis. Analysis of the raw data was calculated as follows, the first dimension HPLC chromatogram was reconstructed by plotting the IR signal of every cut (from total IR SEC chromatogram of the cut) as a function of the elution volume. The IR vs. D1 elution volume was normalized by total IR signal to obtain weight fraction vs. D1 elution volume plot. The IR methyl/ measure ratio was obtained from the reconstructed IR measure and IR methyl chromatograms. The ratio was converted to composition using a calibration curve of PP wt. % (by NMR) vs. methyl/measure obtained from SEC experiments. The MW was obtained from the reconstructed IR measure and LS chromatograms. The ratio was converted to MW after calibration of both IR and LS detectors using a PE standard.

The weight % of isolated PP is measured as the area that corresponds to the hard block composition based on the isolated peak and the retention volume as determined by a composition calibration curve.

Estimating the Crystalline Block Composite Index (CBCI)

Crystalline block composites having CAOP and CAOB composed of crystalline polypropylene and a CEP and CEB composed of crystalline polyethylene cannot be fractionated by conventional means. Techniques based on solvent or temperature fractionation, for example, using xylene fractionation, solvent/non-solvent separation, temperature rising elution fractionation, or crystallization elution fractionation are not capable of resolving the block copolymer since the CEB and CAOB cocrystallize with the CEP and CAOP, respectively. However, using a method such as high temperature liquid chromatography which separates polymer chains using a combination of a mixed solvent/non-solvent and a graphitic column, crystalline polymer species such as polypropylene and polyethylene can be separated from each other and from the block copolymer.

For crystalline block composites, the amount of isolated PP is less than if the polymer was a simple blend of iPP homopolymer (in this example the CAOP) and polyethylene (in this case the CEP). Consequently, the polyethylene fraction contains an appreciable amount of propylene that would not otherwise be present if the polymer was simply a blend of iPP and polyethylene. To account for this "extra propylene", a mass balance calculation can be performed to estimate a crystalline block composite index from the amount of the polypropylene and polyethylene fractions and the weight % propylene present in each of the fractions that are separated by HTLC. The polymers contained within the crystalline block composite include iPP-PE diblock, unbound iPP, and unbound PE where the individual PP or PE components can contain a minor amount of ethylene or propylene respectively.

Composition of the Crystalline Block Composite

A summation of the weight % propylene from each component in the polymer according to equation 1 results in the overall weight % propylene (of the whole polymer). This mass balance equation can be used to quantify the amount of the iPP and PE present in the diblock copolymer. This mass balance equation can also be used to quantify the amount of iPP and PE in a binary blend or extended to a ternary, or n-component blend. For the crystalline block composite, the overall amount of iPP or PE is contained within the blocks present in the diblock and the unbound iPP and PE polymers.

$$\text{Wt \% } C3_{Overall} = w_{PP} (\text{wt \% } C3_{PP}) + w_{PE} (\text{wt \% } C3_{PE}) \qquad \text{Eq. 1}$$

where $w_{PP}$=weight fraction of PP in the polymer $w_{PE}$=weight fraction of PE in the polymer wt % $C3_{PP}$=weight percent of propylene in PP component or block wt % $C3_{PE}$=weight percent of propylene in PE component or block Note that the overall weight % of propylene (C3) is preferably measured from C13 NMR or some other composition measurement that represents the total amount of C3 present in the whole polymer. The weight % propylene in the iPP block (wt % $C3_{PP}$) is set to 100 or if otherwise known from its DSC melting point, NMR measurement, or other composition estimate, that value can be put into its place. Similarly, the weight % propylene in the PE block (wt % $C3_{PE}$) is set to 100 or if otherwise known from its DSC melting point, NMR measurement, or other composition estimate, that value can be put into its place.

Calculating the Ratio of PP to PE in the Crystalline Block Composite

Based on equation 1, the overall weight fraction of PP present in the polymer can be calculated using Equation 2 from the mass balance of the total C3 measured in the polymer. Alternatively, it could also be estimated from a mass balance of the monomer and comonomer consumption during the polymerization. Overall, this represents the amount of PP and PE present in the polymer regardless of whether it is present in the unbound components or in the diblock copolymer. For a conventional blend, the weight fraction of PP and weight fraction of PE corresponds to the individual amount of PP and PE polymer present. For the crystalline block composite, it is assumed that the ratio of the weight fraction of PP to PE also corresponds to the average block ratio between PP and PE present in this statistical block copolymer.

$$w_{PP} = \frac{\text{wt \% } C3_{Overall} - \text{wt \% } C3_{PE}}{\text{wt \% } C3_{PP} - \text{wt \% } C3_{PE}} \qquad \text{Eq. 2}$$

where $w_{PP}$=weight fraction of PP present in the whole polymer wt % $C3_{PP}$=weight percent of propylene in PP component or block wt % $C3_{PE}$=weight percent of propylene in PE component or block Estimating the Amount of the Diblock in the Crystalline Block Composite Applying equations 3 through 5, the amount of the isolated PP that is measured by HTLC analysis is used to determine the amount of polypropylene present in the diblock copolymer. The amount isolated or separated first in the HTLC analysis represents the 'unbound PP' and its composition is representative of the PP hard block present in the diblock copolymer. By substituting the overall weight % C3 of the whole polymer in the left hand side of equation 3, and the weight fraction of PP (isolated from HTLC) and the weight fraction of PE (separated by HTLC) into the right hand side of equation 3, the weight % of C3 in the PE fraction can be calculated using equations 4 and 5. The PE fraction is described as the fraction separated from the unbound PP and contains the diblock and unbound PE. The composition of the isolated PP is assumed to be the same as the weight % propylene in the iPP block as described previously.

$$\text{wt \% C3}_{Overall} = w_{PP\ isolated}(\text{wt \% C3}_{PP}) + w_{PE-fraction}(\text{wt \% C3}_{PE-fraction})$$ Eq. 3

$$\text{wt \% C3}_{PE-fraction} = \frac{\text{wt \% C3}_{Overall} - w_{PPisolated}(\text{wt \% C3}_{PP})}{w_{PE-fraction}}$$ Eq. 4

$$w_{PE-fraction} = 1 - w_{PPisolated}$$ Eq. 5 where $w_{PPisolated}$=weight fraction of isolated PP from HTLC
$W_{PE-fraction}$=weight fraction of PE separated from HTLC, containing the diblock and unbound PE
wt % $C3_{PP}$=weight % of propylene in the PP; which is also the same amount of propylene present in the PP block and in the unbound PP
wt % $C3_{PE-fraction}$=weight % of propylene in the PE-fraction that was separated by HTLC
wt % $C3_{Overall}$=overall weight % propylene in the whole polymer The amount of wt % C3 in the polyethylene fraction from HTLC represents the amount of propylene present in the block copolymer fraction that is above the amount present in the 'unbound polyethylene'.

To account for the 'additional' propylene present in the polyethylene fraction, the only way to have PP present in this fraction, is that the PP polymer chain must be connected to a PE polymer chain (or else it would have been isolated with the PP fraction separated by HTLC). Thus, the PP block remains adsorbed with the PE block until the PE fraction is separated.

The amount of PP present in the diblock is calculated using Equation 6.

$$w_{PP-diblock} = \frac{\text{wt \% C3}_{PE-fraction} - \text{wt \% C3}_{PE}}{\text{wt \% C3}_{PP} - \text{wt \% C3}_{PE}}$$ Eq. 6 where
wt % $C3_{PE-fraction}$=weight % of propylene in the PE-fraction that was separated by HTLC (Equation 4)
wt % $C3_{PP}$=weight % of propylene in the PP component or block (defined previously)
wt % $C3_{PE}$=weight % of propylene in the PE component or block (defined previously)
$w_{PP-diblock}$=weight fraction of PP in the diblock separated with PE-fraction by HTLC The amount of the diblock present in this PE fraction can be estimated by assuming that the ratio of the PP block to PE block is the same as the overall ratio of PP to PE present in the whole polymer. For example, if the overall ratio of PP to PE is 1:1 in the whole polymer, then it assumed that the ratio of PP to PE in the diblock is also 1:1. Thus the weight fraction of diblock present in the PE fraction would be weight fraction of PP in the diblock ($w_{PP-diblock}$) multiplied by two. Another way to calculate this is by dividing the weight fraction of PP in the diblock ($w_{PP-diblock}$) by the weight fraction of PP in the whole polymer (equation 2).

To further estimate the amount of diblock present in the whole polymer, the estimated amount of diblock in the PE fraction is multiplied by the weight fraction of the PE fraction measured from HTLC.

To estimate the crystalline block composite index, the amount of block copolymer is determined by equation 7. To estimate the CBCI, the weight fraction of diblock in the PE fraction calculated using equation 6 is divided by the overall weight fraction of PP (as calculated in equation 2) and then multiplied by the weight fraction of the PE fraction. The value of the CBCI can range from 0 to 1, wherein 1 would be equal to 100% diblock and zero would be for a material such as a traditional blend or random copolymer.

$$CBCI = \frac{w_{PP-diblock}}{w_{PP}} \cdot w_{PE-fraction}$$ Eq. 7 where
$w_{PP-diblock}$=weight fraction of PP in the diblock separated with the PE-fraction by HTLC (Equation 6)
$w_{PP}$=weight fraction of PP in the polymer
$w_{PE-fraction}$=weight fraction of PE separated from HTLC, containing the diblock and unbound PE (Equation 5)

For example, if an iPP-PE polymer contains a total of 62.5 wt % C3 and is made under the conditions to produce an PE polymer with 10 wt % C3 and an iPP polymer containing 97.5 wt % C3, the weight fractions of PE and PP are 0.400 and 0.600, respectively (as calculated using Equation 2). Since the percent of PE is 40.0 wt % and the iPP is 60.0 wt %, the relative ratio of the PE:PP blocks is expressed as 1:1.5.

Hence, if one skilled in the art, carries out an HTLC separation of the polymer and isolates 28 wt % PP and 72 wt % of the PE fraction, this would be an unexpected result and this would lead to the conclusion that a fraction of block copolymer was present. If the C3 content of the PE fraction (wt % $C_{3PE-fraction}$) is subsequently calculated to be 48.9 wt % C3 from equations 4 and 5, the PE fraction containing the additional propylene has 0.556 wt fraction of PE polymer and 0.444 weight fraction of PP polymer ($w_{PP-diblock}$, calculated using Equation 6).

Since the PE fraction contains 0.444 weight fraction of PP, it should be attached to an additional 0.293 weight fraction of PE polymer based on the iPP:PE block ratio of 1.5:1. Thus, the weight fraction of diblock present in the PE fraction is 0.741; further calculation of the weight fraction of diblock present in the whole polymer is 0.533. For the entire polymer, the composition is described as 53.3 wt % iPP-PE diblock, 28 wt % PP polymer, and 18.7 wt % PE polymer. The crystalline block composite index (CBCI) is the estimated weight fraction of diblock present in the whole polymer. For the example described above, the CBCI for the crystalline block composite is 0.533.

The Crystalline Block Composite Index (CBCI) provides an estimate of the quantity of block copolymer within the crystalline block composite under the assumption that the ratio of CEB to CAOB within the diblock is the same as the ratio of crystalline ethylene to crystalline alpha-olefin in the overall crystalline block composite. This assumption is valid for these statistical olefin block copolymers based on the understanding of the individual catalyst kinetics and the polymerization mechanism for the formation of the diblocks via chain shuttling catalysis as described in the specification. The calculation of CBCI is based on the analytical observation that the amount of free CAOP is lower than the total amount of CAOP that was produced in the polymerization. The remainder of the CAOP is bound to CEB to form the diblock copolymer. Because the PE fraction separated by HTLC contains both the CEP and the diblock polymer, the observed amount of propylene for this fraction is above that of the CEP. This difference can be used to calculate the CBCI.

Based solely on the analytical observations without prior knowledge of the polymerization statistics, the minimum and maximum quantities of block copolymer present in a polymer can be calculated, thus distinguishing a crystalline block composite from a simple copolymer or copolymer blend.

The upper bound on the amount of block copolymer present within a crystalline block composite, $w_{DB_{Max}}$, is obtained by subtracting the fraction of unbound PP measured by HTLC from one as in Equation 8. This maximum assumes that the PE fraction from HTLC is entirely diblock and that all crystalline ethylene is bound to crystalline PP with no unbound PE. The only material in the CBC that is not diblock is that portion of PP separated via HTLC.

$$w_{DB_{Max}} = 1 - w_{PP_{isolated}} \qquad \text{Eq. 8}$$

[1] The lower bound on the amount of block copolymer present within a crystalline block composite, $w_{DB_{Min}}$, corresponds to the situation where little to no PE is bound to PP. This lower limit is obtained by subtracting the amount of unbound PP as measured by HTLC from the total amount of PP in the sample as shown in Equation 9.

[2]

$$w_{DB_{Min}} = w_{PP} - w_{PP_{isolated}} \qquad \text{Eq. 9}$$

[3] Furthermore, the crystalline block composite index will fall between these two values: $w_{DB_{Min}} \leq CBCI \leq w_{DB_{Max}}$.

[4] Based on the polymerization mechanism for production of the crystalline block composites, the CBCI represents the best estimate of the actual fraction of diblock copolymer in the composite. For unknown polymer samples, $w_{DB_{Min}}$ can be used to determine if a material is a crystalline block composite. Consider the application of this analysis to homopolymers, copolymers or blends. For a physical blend of PE and PP, the overall weight fraction of PP should be equal to that of the wt % PP from HTLC and the lower bound on diblock content, Equation 9, is zero. If this analysis is applied to a sample of PP that does not contain PE both the weight fraction of PP and amount of PP obtained from HTLC are 100% and again the lower bound on diblock content, Equation 9, is zero. Finally if this analysis is applied to a sample of PE that does not contain PP then both the weight fraction of PP and weight fraction PP recovered via HTLC are zero and the lower bound on diblock, Equation 9, is zero. Because the lower bound on diblock content is not greater than zero in any of these three cases, these materials are not crystalline block composites.

Compression Molding

Unless mentioned otherwise, plaques were used for microtensile test were prepared by compression molding using a Tetrahedron press. The polymer was pre-melted at 190° C. for 1 minute at 5 klb and then pressed for 5 minutes at 30 klb and then quenched to ice water bath. Some were cooled at 5° C. min-1 between chilled platens using circulating water under 30 klb. The nominal plaque thickness was 2.9 mm. The compression molded plaques were used for microtensile and Izod impact testing.

Tensile Testing

Stress-strain behavior in uniaxial tension was measured using ASTM D1708 microtensile specimens. The gauge length of samples is 22 mm and samples were stretched with an Instron at 554% min-1 at 23° C. Tensile strength and elongation at break were reported for an average of 5 specimens. Additional stress-strain behavior in uniaxial tension was measured using ASTM Compression Molded D638 at 2 in/min.

Izod Impact

The notched Izod impact tests were performed on compression molded specimens. Samples were cut from the same plaques used for tensile test to have the dimensions 63.5 mm×12.7 mm×2.9 mm. The samples were notched using a notcher to produce a notch depth 2.54+/−0.05 mm in accordance to ASTM D256. Five specimens of each sample were tested at 23° C. and 0° C.

Flexural Modulus

Flexural 1 or 2% percent secant moduli were measured according to ASTM D-790. Samples are prepared by injection molding of tensile bars (approx. 165 mm×19 mm×3 mm) and conditioned for at least 40 hours at room temperature.

Dart

Instrumented dart impact was measured using a 6 cm×6 cm×2 mm sample in a CEAST falling dart impact tester. Strike velocity was set at 4.3 m/sec with a 25 Kg load.

Charpy

Notched Charpy impact testing was done according to ISO 294-1 type B.

Environmental Stress Crack Resistance (ESCR)

ESCR was measured according to ASTM D 1693 in 10% and 100% Igepal™ at 50° C. Polymer plaques were prepared by compression molding in accordance to ASTM D 4703 using a Tetrahedron press. The compression molding temperature is 190° C. and nominal plaques thickness is 0.075 in. The results are given in hours to the 5th, or 50th percentile, failure, f50, out of 10 samples.

Transmission Electron Microscopy (TEM)

The injection molded and compression molded samples were examined with TEM. Samples were trimmed so that sections could be collected near the core of the parts. The trimmed samples were cryopolished prior to staining by removing sections from the blocks at −60° C. to prevent smearing of the elastomer phases. The cryopolished blocks were stained with the vapor phase of a 2% aqueous ruthenium tetraoxide solution for 3 hrs at ambient temperature. The staining solution was prepared by weighing 0.2 gm of ruthenium (III) chloride hydrate (RuCl3×H$_2$O) into a glass bottle with a screw lid and adding 10 mL of 5.25% aqueous sodium hypochlorite to the jar. The samples were placed in the glass jar using a glass slide having double sided tape. The slide was placed in the bottle in order to suspend the blocks about 1 inch above the staining solution. Sections of approximately 90 nanometers in thickness were collected at ambient temperature using a diamond knife on a Leica EM UC6 microtome and placed on 600 mesh virgin TEM grids for observation. For image collection, TEM images were collected on a JEOL JEM-1230 operated at 100 kV accelerating voltage and collected on a Gatan-791 and 794 digital cameras.

Scanning Electron Microscopy (SEM)

For high resolution SEM study, small pieces were cut out of the plaques. The samples were mounted on a sample holder and trimmed at −100° C. using diamond trimming knife with a Leica EM FC7. Subsequently the samples were stained in RuO4 vapor over night. After rinsing and drying, the block samples were further polished using the microtome with a diamond knife at room temperature. The SEM images of the block samples were obtained with a NOVA nanoSEM 600 (FEI, Eindhoven, The Netherlands) operated at high vacuum mode with 3 kV and spot 4. The images were acquired using a vCD back scattered electron detector in inversed contrast. Contrast in RuO4 stained sample was created by differing degrees of absorption of the heavy metal stain in the material.

Optical Microscopy (OM)

The rotomolded plaques were sectioned using a wood plane in the thickness direction. The cut section was unrolled and adhered to microscope slides with the aid of double-sided tape. A region of interest (ROI) of the cross-section measuring approximately, 2 inches was coated with iridium for 30 seconds, using an "Emitech K575X" turbo plasma coater in order to render the specimens reflective under illuminated light. The coated molding cross-section was illuminated with an reflected light and a Leica MZ-16 stereo microscope was used at low magnification (2 mm scale) to capture digital images of the bubble-like defects using a Nikon DMX digital camera and "ACT1" software.

Density is measured in accordance with ASTM D 792.

Melt flow rate or $I_2$ of the samples is measured using ASTM D 1238, Condition 230° C., 2.16 kg. Melt Index is measured using ASTM D 1238, Condition 190° C., 2.16 kg. Melt flow rate or $I_{10}$ of the samples is measured using ASTM D1238, Condition 230° C., 10 kg. Melt Index is measured using ASTM D 1238, Condition 190° C., 10 kg.

EXAMPLES

Crystalline Block Composites

The crystalline block composite of the present Examples are designated CBC1 and CBC2. They are prepared using two continuous stirred tank reactors (CSTR) connected in series. The first reactor was approximately 12 gallons in volume while the second reactor was approximately 26 gallons. Each reactor is hydraulically full and set to operate at steady state conditions. Monomers, solvent, hydrogen, catalyst-1, cocatalyst-1, cocatalyst-2 and CSA-1 are fed to the first reactor according to the process conditions outlined in Table A. The first reactor contents as described in Table A flow to a second reactor in series. Additional monomers, solvent, hydrogen, catalyst-1, cocatalyst-1, and optionally, cocatalyst-2, are added to the second reactor.

Catalyst-1 ([[rel-2′,2′′′-[(1R,2R)-1,2-cylcohexanediylbis(methyleneoxy-κO)]bis[3-(9H-carbazol-9-yl)-5-methyl[1,1′-biphenyl]-2-olato-κO]](2-)]dimethyl-hafnium) and cocatalyst-1, a mixture of methyldi($C_{14-18}$alkyl)ammonium salts of tetrakis(pentafluorophenyl)borate, prepared by reaction of a long chain trialkylamine (Armeen™ M2HT, available from Akzo-Nobel, Inc.), HCl and Li[B($C_6F_5$)$_4$], substantially as disclosed in U.S. Pat. No. 5,919,983, Ex. 2., are purchased from Boulder Scientific and used without further purification.

CSA-1 (diethylzinc or DEZ) and cocatalyst-2 (modified methylalumoxane (MMAO)) were purchased from Akzo Nobel and used without further purification. The solvent for the polymerization reactions is a hydrocarbon mixture (ISOPAR® E) obtainable from ExxonMobil Chemical Company and purified through beds of 13-X molecular sieves prior to use.

TABLE A

Reactor process conditions to produce crystalline block composites

| Material | CBC1 | | CBC2 | |
|---|---|---|---|---|
| Reactor | 1st Reactor | 2nd Reactor | 1st Reactor | 2nd Reactor |
| Reactor Control Temp.(° C.) | 140 | 135 | 141 | 135 |
| Solvent Feed (lb/hr) | 212 | 245 | 242 | 245 |
| Propylene Feed (lb/hr) | 5.46 | 49.3 | 5.44 | 48.76 |
| Ethylene Feed (lb/hr) | 47.1 | 0.0 | 47.0 | 0.0 |
| Hydrogen Feed SCCM) | 9.6 | 9.9 | 9.5 | 0.0 |
| Reactor Ethylene Conc. (g/L) | 3.84 | — | 4.41 | — |
| Reactor Propylene Conc. (g/L) | — | 2.00 | — | 2.26 |
| Catalyst Efficiency (gPoly/gM) *1.0E6 | 0.86 | 0.025 | 0.706 | 0.075 |
| Catalyst Flow (lb/hr) | 1.96 | 2.14 | 0.47 | 1.78 |
| Catalyst Conc. (ppm) | 30 | 900 | 150 | 500 |
| Cocatalyst-1 Flow (lb/hr) | 1.47 | 2.16 | 1.41 | 1.12 |
| Cocatalyst-1 Conc. (ppm) | 400 | 7500 | 500 | 8000 |
| Cocat.-2 Flow (lb/hr) | 0 | 0.30 | 1.18 | 0.75 |
| Cocat.-2 Conc. (ppm) | 0 | 2686 | 1993 | 1993 |
| DEZ Flow (lb/hr) | 1.94 | 0 | 1.89 | 0 |
| DEZ Conc. (ppm) | 30000 | 0 | 30000 | 0 |

TABLE B

Crystalline block composite physical properties

| Example | MFR (230° C./ 2.16 kg) | Wt % PP from HTLC Separation | Mw Kg/mol | Mw/ Mn | Total Wt % $C_2$ | Tm (° C.) Peak 1 (Peak 2) | Tc (° C.) | Melt Enthalpy (J/g) |
|---|---|---|---|---|---|---|---|---|
| CBC1 | 7.0 | 14.2 | 128 | 4.0 | 46.9 | 132 (108) | 91 | 97 |
| CBC2 | 7.5 | 19.4 | 109 | 2.8 | 48.3 | 129 (108) | 91 | 91 |

TABLE C

Crystalline Block Composite Index Estimation

| Sample | wt % iPP | wt % EP | Wt % $C_2$ in EP | Crystalline Block Composite Index |
|---|---|---|---|---|
| CBC1 | 50 | 50 | 90 | 0.707 |
| CBC2 | 50 | 50 | 90 | 0.633 |

Materials

TABLE 1

Description of materials

| Material | Description |
|---|---|
| CBC1 | 50/50 EP/iPP, 90 wt % C2 in EP, 7.0 MFR |
| CBC2 | 50/50 EP/iPP, 90 wt % C2 in EP, 7.5 MFR |
| PP1 | PP homopolymer, DH375, Density = 0.900 g/cm3, MFR = 4.0 g/10 min (@230° C., 2.16 kg), Braskem |
| PP2 | PP homopolymer, DH542.01, Density = 0.900 g/cm3, MFR = 12 g/10 min (@230° C., 2.16 kg), Braskem |
| PP3 | PP homopolymer, PD702, Density = 0.900 g/cm3, MFR = 35 g/10 min (@230° C., 2.16 kg), LyondellBasell Industries |
| PP4 | PP homopolymer using Metallocene catalyst, Achieve 1605, Density = 0.900 g/cm3, MFR = 32 g/10 min (@230° C., 2.16 kg), ExxonMobil Chemical |
| HDPE1 | HDPE DMDA 6400, Density = 0.961 g/cm3, MI = 0.8 g/10 min (@190° C.), The Dow Chemical Company |
| HDPE2 | HDPE DMDA 8907, Density = 0.952 g/cm3, MI = 6.7 g/10 min (@190° C.), The Dow Chemical Company |
| HDPE3 | HDPE DMDA 8920, Density = 0.956 g/cm3, MI = 20 g/10 min (@190° C.), The Dow Chemical Company |
| HDPE4 | HDPE DMDA 8007, Density = 0.965 g/cm3, MI = 8.25 g/10 min (@190° C.), The Dow Chemical Company |
| MDPE1 | DOWLEX ™ 2432E, Density = 0.939 g/cm3, MI = 7 g/10 min (@190° C.), The Dow Chemical Company |
| MDPE2 | DMDA 3135, Density = 0.938 g/cm3, MI = 3.5 g/10 min (@190° C.), The Dow Chemical Company |
| POE1 | ENGAGE ™ 8100; Density = 0.870 g/cc, MI = 1 g/10 min (@190° C.), The Dow Chemical Company |
| POE2 | ENGAGE ™ 8842; Density = 0.857 g/cc, MI = 1 g/10 min (@190° C.), The Dow Chemical Company |
| OBC1 | INFUSE ™ 9077 ethylene octene block copolymer, Density = 0.870 g/cc, MI = 0.5 g/10 min (@190° C.), The Dow Chemical Company |
| OBC2 | INFUSE ™ 9100; ethylene octene block copolymer, Density = 0.877 g/cm3, MI = 1.0 g/10 min (@190° C.), The Dow Chemical Company |
| OBC3 | INFUSE ™ 9500; ethylene octene block copolymer, Density = 0.877 g/cm3, MI = 5.0 g/10 min (@190° C.), The Dow Chemical Company |
| PBE1 | VERSIFY ™ 2400, Density = 0.858 g/cm3, MFR = 2.0 g/10 min (@230° C., 2.16 kg), The Dow Chemical Company |
| AO1 | Antioxidant, Irganox B225, BASF |
| AO2 | Antioxidant, Irgastab FS042, CAS #: 143925-92-2, BASF |

Examples 1-4, Comparatives A-F

Methods

The blend formulations were compounded using a Haake Rheomix mixer rotating at 50 RPM, according to compositions shown in Table 2. The mixer is preheated to 190° C. The mixing is kept for 5 min after the ram is secured down.

TABLE 2

Compounding composition

| Ex | PP1 | HDPE1 | CBC1 | POE1 | PBE1 | OBC1 | OBC2 | AO1 |
|---|---|---|---|---|---|---|---|---|
| A | 60 | 40 | — | — | — | — | — | 0.2 |
| B | 54 | 36 | — | 10 | — | — | — | 0.2 |
| C | 54 | 36 | — | — | 10 | — | — | 0.2 |
| D | 54 | 36 | — | — | — | — | 10 | 0.2 |
| E | 54 | 36 | — | — | — | 10 | — | 0.2 |
| F | 54 | 36 | 10 | — | — | — | — | 0.2 |
| 1 | 54 | 36 | 5 | 5 | — | — | — | 0.2 |
| 2 | 54 | 36 | 5 | — | 5 | — | — | 0.2 |
| 3 | 54 | 36 | 5 | — | — | — | 5 | 0.2 |
| 4 | 54 | 36 | 5 | — | — | 5 | — | 0.2 |

Results

Figure 2:
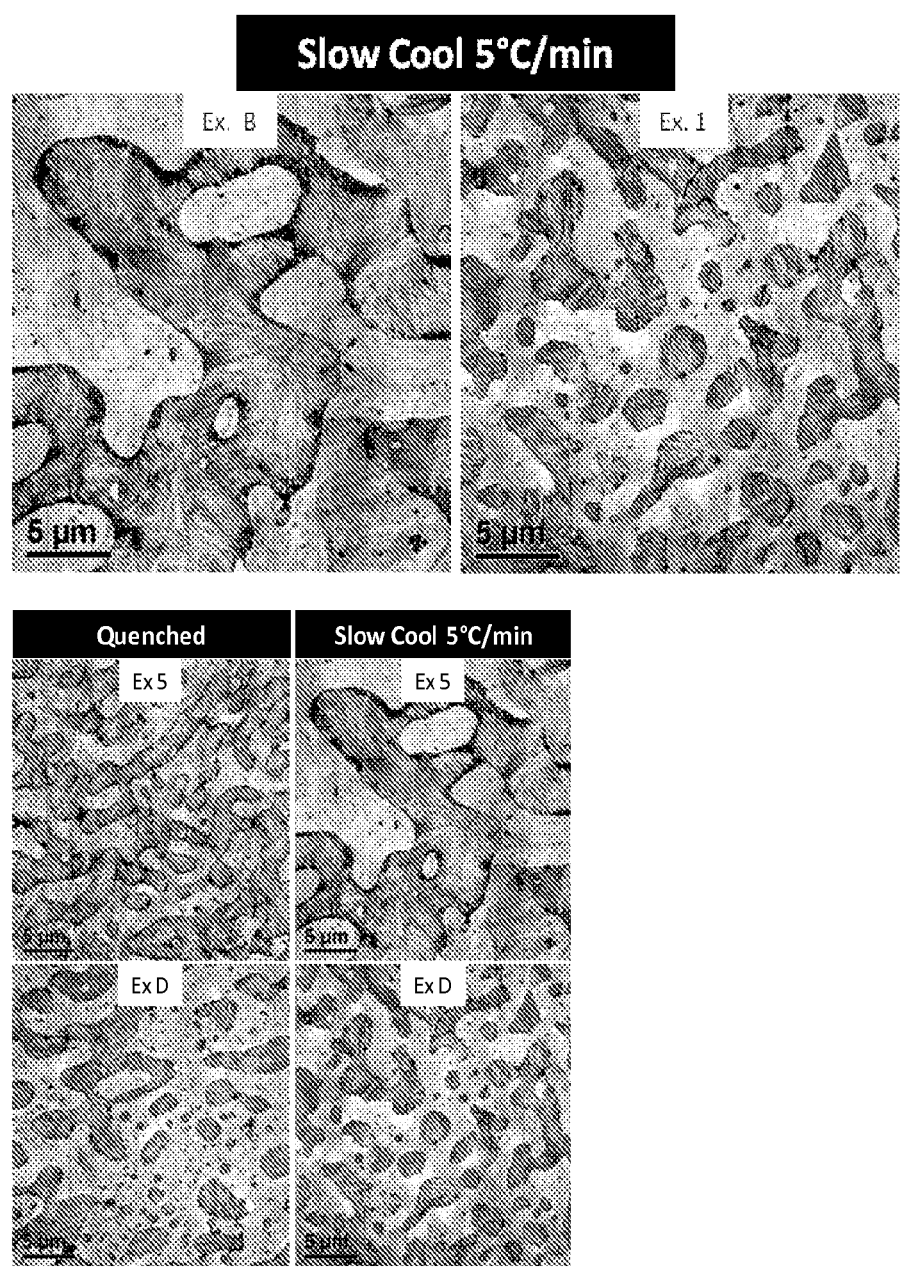
FIG. 2 shows TEM morphology for Ex B and Ex 1.
Figure 3:
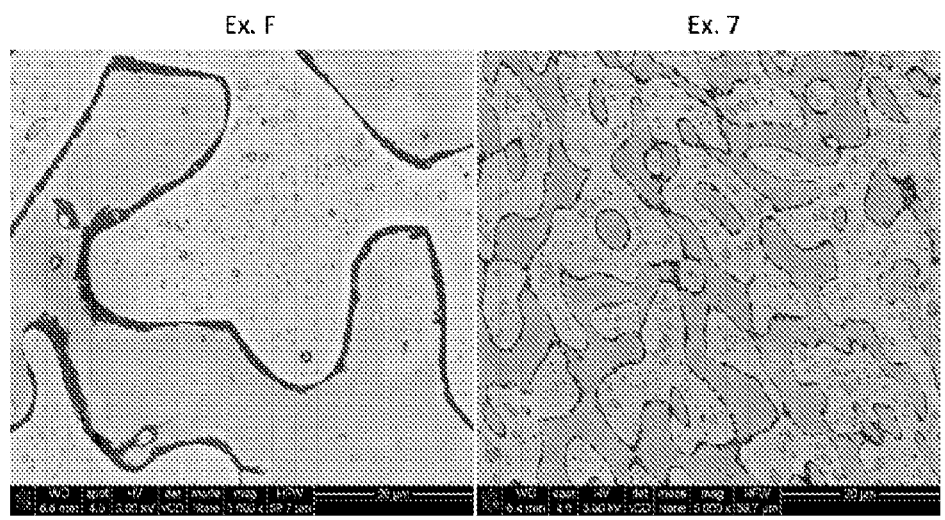
FIG. 3 shows SEM Morphology of compression molded plaques at core. The bright phase is PP, the darker phase is HDPE and the darkest phase is OBC1.
Figure 4:
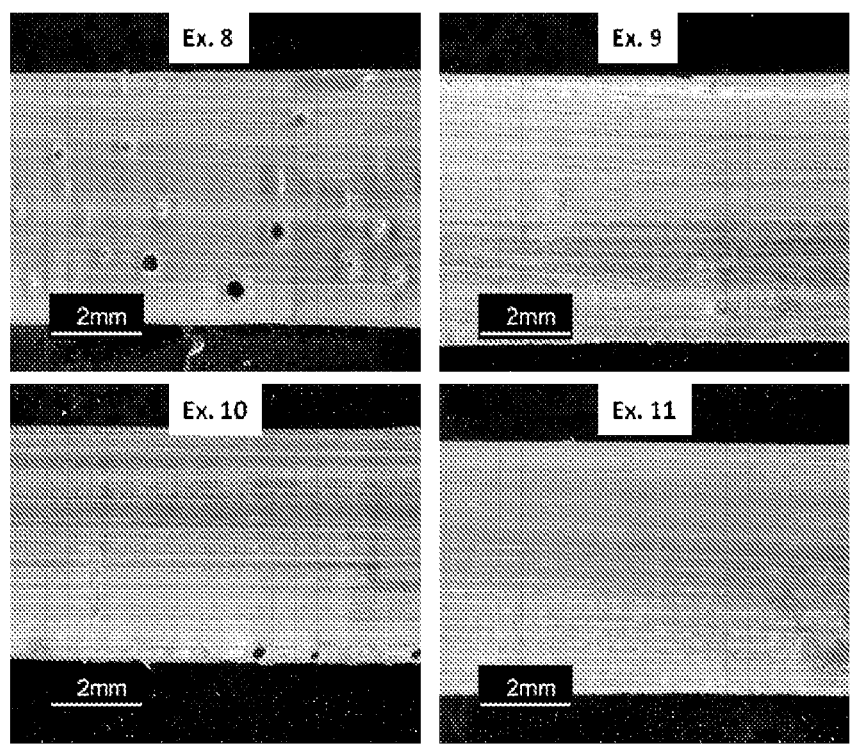
FIG. 4 shows Optical microscopy characterizations of bubble formation for Ex 9-11.

The data set to study the effect of cooling rate on mechanical properties is tabulated in Table 3 and shown in FIG. 2. The Examples 1 to 4 give better impact strength/modulus balance vs comparative examples A to F. For example, each of Examples 1 to 4 provide a good elongation at break (such as at least 12%), a good tensile modulus (such as at least 130000 psi possibly with an upper limit of 1000000 psi), a good toughness (such as at least 6.0 in*lbf possibly with an upper limit of 100 in*lbf), a good stress at yd (such as at least 3800 psi possibly with an upper limit of 10000 psi), a good Izod impact @ 23° C. (such as at least 10 $KJ/m^2$ possibly with an upper limit of 1000 $KJ/m^2$), and a good Izod impact @ 0° C. (such as at least 10 $KJ/m^2$ possibly with an upper limit of 1000 $KJ/m^2$). FIG. 3 shows morphology stability of Ex 1 after slow cooling at 5° C./min, whereas dispersed phase coalesced significantly after slow cooling for Ex B.

TABLE 3

Results of Virgin PP/HDPE blends (5° C./min)

| Ex | Elong at br (%) | Ten Modulus (psi) | Toughness (in*lbf) | Stress at yd (psi) | 23° C. Izod Impact ($KJ/m^2$) | 0° C. Izod Impact ($KJ/m^2$) |
|---|---|---|---|---|---|---|
| A | 5.3 | 147631 | 2.4 | 3990 | 2.1 | 1.6 |
| B | 13.5 | 121823 | 7.4 | 3509 | 6.8 | 5.4 |
| C | 27.2 | 116720 | 14.5 | 3089 | 7.1 | 5.0 |
| D | 21.6 | 123209 | 12.4 | 3163 | 11.0 | 8.1 |
| E | 25.9 | 115994 | 12.7 | 2404 | 11.8 | 10.7 |
| F | 11.3 | 138306 | 7.3 | 4516 | 6.9 | 4.5 |
| 1 | 18.2 | 130467 | 12.2 | 4177 | 11.8 | 7.0 |
| 2 | 12.5 | 132582 | 7.7 | 4018 | 10.6 | 5.8 |
| 3 | 23.9 | 133662 | 15.5 | 4029 | 13.7 | 8.0 |
| 4 | 20.5 | 134069 | 13.2 | 3867 | 15.7 | 10.1 |

Examples 5 and 6, Comparatives G and H

Experimental

The formulations in Table 5 were prepared on a BUSS compounder, granulated and then sent to be cryogenically ground. Furthermore a sample of DOWLEX™ 2432 (Ex. G) was included to also be cryogenically ground in order for this sample to be used as a reference. The blend formulations are compounded using a BUSS compounder (MDK/B 46-15LD), granulated with an underwater cutter. The pellets are ground cryogenically a typical powder specification as shown in Table 6. The powders were then compression molded according to ISO 293-2004 where the powders were loaded in a frame, placed in the mould (180 C) and the platens closed to a low pressure setting (6-12 bar) for 10 minutes preheat time. The mould was then closed at high pressure (80 bar) for 2 minutes. Then the material is allowed to cool at a cooling rate of 15 C+/−5 C/min until the samples are cold enough to be removed from the mold.

TABLE 5

Rotomolding compounds

| Sample | PP2 | HDPE2 | CBC2 | OBC1 | AO1 |
|---|---|---|---|---|---|
| 5 | 53.8 | 36 | 5 | 5 | 0.2 |
| 6 | 52.3 | 35 | 5 | 7.5 | 0.2 |
| G | 54.8 | 37.5 | 0 | 7.5 | 0.2 |

TABLE 6

Powder Grinding Parameters

| Fraction | Size (Microns) |
|---|---|
| Max 1% | bigger than 600 um |
| 5-20% | ~425 um |
| 25-40% | ~300 um |
| 20-35% | ~212 um |
| Max 15% | smaller than 150 um |

TABLE 7

Physical properties

| | Sample | 5 | 6 | G | H |
|---|---|---|---|---|---|
| Compression molded properties of granules | Flex Mod (MPa) | 1209 | 1188 | 1134 | 781 |
| | Charpy +23° C. (kJ/m$^2$) | 10.9 | 15.2 | 5.9 | 11.2 |
| | Charpy +0° C. (kJ/m$^2$) | 7.3 | 9.4 | 5.6 | 8.0 |
| | Charpy −20° C. (kJ/m$^2$) | 5.0 | 7.0 | 4.5 | 6.6 |
| | ESCR Bell (10% Ig., hrs) | 461 | 693 | 384 | 20 |
| Compression molded properties of powders | Flex mod (MPa) | 1200 | 1188 | 1140 | 785 |
| | Yield stress (MPa) | 23.6 | 22.0 | 17.5 | 18.6 |
| | Yield strain (%) | 5.9 | 7.2 | 21.3 | 12.1 |
| | Charpy +23° C. (kJ/m$^2$) | 10.0 | 12.0 | 6.2 | 11.6 |
| | Charpy 0° C. (kJ/m$^2$) | 7.0 | 7.2 | 4.6 | 8.3 |
| | Charpy −10° C. (kJ/m$^2$) | 5.2 | 6.1 | 5.0 | 6.7 |
| | Dart +23° C. (J) | 21.5 | 23.2 | 6.8 | 19.5 |
| | Dart −20° C. (J) | 6.4 | 27.3 | 2.8 | 23.6 |

Results

As can be seen in Table 7 when CBC is added to the HDPE/PP/OBC systems it results in an increase in the impact performance while at the same time the stiffness of the formulations is maintained which gives a formulation that shows enhanced impact over the non compatibilized samples and enhanced stiffness and impact over the DOWLEX™ samples. The effect of the CBC is seen in the micrographs obtained on the samples where a finer morphology is observed when CBC is added to the system.

Furthermore one sees the large improvement in the ESCR of the samples when PP is included. This is a useful property in applications such as rotomoulding where materials are used for the storage of chemicals. Such compounds would overcome the problem of having to try and use very high molecular weight PE to obtain sufficient ESCR but at the same time sacrificing processibility. These materials shown here have the potential to combine both processibility and ESCR.

Examples 7-10

Experimental

The blend formulations are compounded using a W&P ZSK25 twin screw extruder, according to the formulations shown in Table 8. For the formulations in Table 8, A02 may be added in place of or in addition to A01. The extruder has 8 heated zones, which was set at 140, 190, 190, 190, 190, 190, 190, and 190° C., respectively. The screw speed is run at 400 rpm, with a torque at 50-60% and a feed rate of 40 lbs hr-1. The polymer melt temperature is measured to be 218° C. The pellets are pelletized with a strand cutter. The pellets are all ground cryogenically using a 35 mesh/500 microns screen. The powders are rotomolded with Rotoline DC 2.50 XT with a Major Axis at 6 rpm and Minor Axis at 1.5 rpm. The mold dimension is (13×13×4 inch). Typical molding condition is shown in Table 9.

TABLE 8

Formulation

| Ex. | PP3 | PP4 | HDPE2 | HDPE3 | CBC1 | OBC3 | AO2 | AO1 |
|---|---|---|---|---|---|---|---|---|
| 7 | 52.3 | — | 35 | — | 5 | 7.5 | 0 | 0.2 |
| 8 | 52.2 | — | 35 | — | 5 | 7.5 | 0.1 | 0.2 |
| 9 | — | 52.2 | 35 | — | 5 | 7.5 | 0.1 | 0.2 |
| 10 | 52.2 | — | — | 35 | 5 | 7.5 | 0.1 | 0.2 |

TABLE 9

Rotomolding conditions

| Shot Size (lbs) | Oven Temp Set point (° F.) | Cook Time (minutes) | Water Mist (minutes) | Total Cool Time (minutes) | Total Cycle Time (minutes) |
|---|---|---|---|---|---|
| 3 | 500 | 17 | 25 | 2 | 42 |

The properties of rotomolded parts are shown in Table 16. Ex. 7 shows bubble formation in the interior of the plaque. Ex. 8 to 10 are virtually bubble free. Ex. 9 has some surface bubbles on the mold side, but there are no internal bubbles. Addition of alkyl hydroxylamine (AO2) helps the fusion of powders and removal of internal bubbles. Accordingly, in exemplary embodiments, the rotomolded parts are substantially free of internal bubbles and/or overall substantially free of bubbles (which includes surface bubbles and internal bubbles).

TABLE 10

Bubble formation and Physical properties

| Ex. | Bubble | Flex 1% (ksi) | 23° C. Izod strength (kJ/m$^2$) | 0° C. Izod strength (kJ/m$^2$) | −18° C. Izod strength (kJ/m$^2$) |
|---|---|---|---|---|---|
| 7 | Interior bubble | 122 | 7.1 | 4.8 | 3.9 |
| 8 | Bubble free | 136 | 8.3 | 6.1 | 5.9 |
| 9 | Bubble free | 125 | 8.5 | 5.7 | 5.2 |
| 10 | Bubble free | 141 | 6.0 | 4.6 | 4.1 |

Examples 11 and 12, Comparatives J-L

Experimental

The blend formulations were compounded using a W&P ZSK25 twin screw extruder. The formulations are shown in Table 11. For the formulations in Table 11, A02 may be added in place of or in addition to A01. Only the percentage of added modifier is shown in the tables, balance being the matrix materials. The samples are compression molded and cooled at 5° C. min-1 between chilled platens using circulating water.

TABLE 11

| | | | Formulations | | | | |
|---|---|---|---|---|---|---|---|
| Ex. | PP3 | HDPE4 | MDPE2 | CBC1 | OBC3 | POE2 | AO1 |
| J | — | — | 100 | — | — | — | — |
| K | — | 85 | — | — | — | 15 | 0.1 |
| L | 30 | 55 | — | — | 15 | — | 0.1 |
| 11 | 30 | 50 | — | 5 | 15 | — | 0.1 |
| 12 | 30 | — | 57.5 | 5 | 7.5 | — | 0.1 |

The properties of compression molded parts are shown in Table 12. Ex. J (MDPE) has good Izod toughness, but low modulus. Ex. K has good modulus and toughness, but low ESCR (expected). Ex. L, being an uncompatibilized blend, shows poor impact strength. Ex 11 and 12 show a balanced property of good modulus (such as at least 95 ksi possibly with an upper limit of 1000 ksi), a good impact toughness, and good ESCR (expected). For example, the Izod impact @ 23° C. may be at least 10 KJ/m$^2$ possibly with an upper limit of 1000 KJ/m$^2$, the Izod impact @ 0° C. may be as at least 10 KJ/m$^2$ possibly with an upper limit of 1000 KJ/m$^2$, and the Izod impact @ −18° C. may be at least 9 KJ/m$^2$ possibly with an upper limit of 1000 KJ/m$^2$.

TABLE 12

| | | Physical properties | | |
|---|---|---|---|---|
| Ex. | Flex 1% (ksi) | 23° C. Izod strength (kJ/m$^2$) | 0° C. Izod strength (kJ/m$^2$) | −18° C. Izod strength (kJ/m$^2$) |
| J | 88 | 30.2 | 12.6 | 12.7 |
| K | 127 | 55.7 | 50.4 | 10.0 |
| L | 114 | 6.4 | 4.6 | 5.1 |
| 11 | 139 | 26.8 | 10.2 | 9.9 |
| 12 | 101 | 52.0 | 51.1 | 44.5 |

What is claimed is:

1. A composition, comprising:
   a) one or more polyethylene different from di;
   b) one or more polypropylene different from dii;
   c) one or more polyolefin elastomer; and
   d) a crystalline block composite comprising three components:
      i) a crystalline ethylene based polymer,
      ii) a crystalline propylene based polymer, and
      iii) a block copolymer having a crystalline ethylene based block and a crystalline propylene block,
      wherein the composition of component i) is the same as the crystalline ethylene based block of the block copolymer and the composition of component ii) is the same as the crystalline propylene block of the block copolymer, and
      wherein the one or more polyolefin elastomer includes an olefin block copolymer having an ethylene/α-olefin copolymer.

2. The composition as claimed in claim 1, wherein the block copolymer comprises from 5 wt % to 95 wt % crystalline ethylene based blocks and from 95 wt % to 5 wt % crystalline propylene blocks.

3. The composition as claimed in claim 1, wherein the block Copolymer diii comprises from 30 to 70 wt % crystalline ethylene based blocks and 70 to 30 wt % crystalline propylene blocks.

4. The composition as claimed in claim 1, wherein the amount of the one or more polyolefin elastomer is from 1 wt % to 45 wt %, based on a total weight of the composition.

5. The composition as claimed in claim 1, wherein the crystalline ethylene based block includes at least 85 wt % of ethylene and the propylene based polymer is isotactic polypropylene.

6. The composition as claimed in claim 1, wherein block copolymers include from 40 wt % to 60 wt % of crystalline propylene blocks, and a remainder of crystalline ethylene based blocks based on the total weight of the block copolymers.

7. An article prepared using the composition of claim 1.

8. A rotomolded article prepared using the composition of claim 1.

9. A rotomolding process performed using the composition as claimed in claim 1.

* * * * *